United States Patent
Hu et al.

(10) Patent No.: US 11,376,833 B2
(45) Date of Patent: Jul. 5, 2022

(54) PROCESS TO FORM A TILE USING LOW TEMPERATURE HEAT LAMINATION

(71) Applicant: Dow Global Technologies LLC, Midland, MI (US)

(72) Inventors: Yushan Hu, Pearland, TX (US); Ronald J. Weeks, Lake Jackson, TX (US); Mark T. Jablonka, Lake Jackson, TX (US); Lizhi Liu, Lake Jackson, TX (US)

(73) Assignee: Dow Global Technologies LLC, Midland, TX (US)

( * ) Notice: Subject to any disclaimer, the term of this patent is extended or adjusted under 35 U.S.C. 154(b) by 226 days.

(21) Appl. No.: 16/639,465

(22) PCT Filed: Aug. 16, 2018

(86) PCT No.: PCT/US2018/000175
§ 371 (c)(1),
(2) Date: Feb. 14, 2020

(87) PCT Pub. No.: WO2019/035907
PCT Pub. Date: Feb. 21, 2019

(65) Prior Publication Data
US 2021/0129513 A1    May 6, 2021

Related U.S. Application Data

(60) Provisional application No. 62/546,178, filed on Aug. 16, 2017.

(51) Int. Cl.
*B32B 37/06* (2006.01)
*B32B 5/02* (2006.01)
(Continued)

(52) U.S. Cl.
CPC .............. *B32B 37/06* (2013.01); *B32B 5/022* (2013.01); *B32B 7/12* (2013.01); *B32B 27/08* (2013.01);
(Continued)

(58) Field of Classification Search
CPC ..... B32B 2331/04; B32B 27/18; B32B 37/06; B32B 2307/732; B32B 2255/10;
(Continued)

(56) References Cited

U.S. PATENT DOCUMENTS 5,158,641 A    10/1992   Vermeulen et al.
7,426,568 B2   9/2008    Swan
(Continued)

FOREIGN PATENT DOCUMENTS

CN    107031155 B    3/2019
EP       433060 A3   2/1992
(Continued)

OTHER PUBLICATIONS

Machine translation of CN 10731155A; Published Aug. 11, 2017; Inventor Huayi Li.*
(Continued)

*Primary Examiner* — Vishal I Patel

(57) ABSTRACT

A method to produce a tile comprising at least the following layered sections: a wear layered section, a decor layered section and a base layered section; and wherein the wear layered section comprises the following: A) a compositional layer A formed from a composition A comprising at least one olefin-based polymer; wherein the decor layered section comprises the following: B1) a compositional layer B1 formed from a composition B1 comprising a propylene-based polymer; B2) a compositional layer B2 formed from a composition B2 comprising an olefin-based polymer; wherein the base layered section comprises the following:
(Continued)

Figure 1:
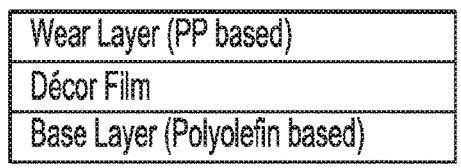

C) a compositional layer C formed from a composition C comprising an olefin-based polymer; wherein the method comprises the following step(s): i) heat laminating compositional layer A to compositional layer B1, at a temperature $T1 \leq 140°$ C.; and wherein, for a continuous production of the tile, T1 is the temperature at the surface of the compositional layer with the highest, or equivalent, surface temperature; and for a batch production of the tile, T1 is the interfacial temperature between the two compositional layers; ii) heat laminating compositional layer B2 to compositional layer C, at a interfacial temperature $T2 \leq 140°$ C.; and wherein, for a continuous production of the tile, T2 is the temperature at the surface of the compositional layer with the highest, or equivalent, surface temperature; and for a batch production of the tile, T2 is the interfacial temperature between the two compositional layers.

13 Claims, 7 Drawing Sheets

(51) Int. Cl.
| | | |
|---|---|---|
| *B32B 7/12* | (2006.01) | |
| *B32B 27/08* | (2006.01) | |
| *B32B 27/12* | (2006.01) | |
| *B32B 27/18* | (2006.01) | |
| *B32B 27/32* | (2006.01) | |
| *C08L 23/08* | (2006.01) | |

(52) U.S. Cl.
CPC .............. *B32B 27/12* (2013.01); *B32B 27/18* (2013.01); *B32B 27/32* (2013.01); *C08L 23/0815* (2013.01); *B32B 2255/10* (2013.01); *B32B 2262/101* (2013.01); *B32B 2307/4023* (2013.01); *B32B 2309/02* (2013.01); *B32B 2323/10* (2013.01); *B32B 2331/04* (2013.01); *B32B 2375/00* (2013.01); *B32B 2419/04* (2013.01)

(58) Field of Classification Search
CPC . B32B 5/022; B32B 2323/10; B32B 2375/00; B32B 27/32; B32B 7/12; B32B 2255/26; B32B 2307/514; B32B 2419/04; B32B 27/16; B32B 2262/101; B32B 33/00; B32B 2309/02; B32B 27/08; B32B 2307/4023; B32B 27/12; C08L 23/0815
See application file for complete search history.

(56) References Cited

U.S. PATENT DOCUMENTS

| | | | |
|---|---|---|---|
| 7,833,611 B2 | 11/2010 | Phan et al. | |
| 8,592,501 B2 | 11/2013 | Phan et al. | |
| 9,359,773 B2 | 6/2016 | Hahn et al. | |
| 10,392,490 B2* | 8/2019 | Wu ...................... | C09D 123/14 |
| 2002/0015527 A1 | 2/2002 | Nambu | |
| 2007/0059515 A1 | 3/2007 | Cheung | |
| 2008/0026197 A1 | 1/2008 | Cheung | |
| 2012/0148849 A1 | 6/2012 | Fan et al. | |
| 2015/0165748 A1 | 6/2015 | Anspach et al. | |
| 2016/0340916 A1 | 11/2016 | Wright et al. | |
| 2017/0073979 A1 | 3/2017 | Clement | |

FOREIGN PATENT DOCUMENTS

| | | |
|---|---|---|
| EP | 0868995 A3 | 4/1999 |
| EP | 0955158 A2 | 11/1999 |
| EP | 1129844 A1 | 9/2001 |
| EP | 2878440 B1 | 2/2019 |
| GB | 2310631 B | 9/1999 |
| JP | 1214429 A | 2/1997 |
| TW | 201416527 A | 5/2014 |
| WO | 2001/051724 A1 | 7/2001 |
| WO | 2008/103887 A1 | 8/2008 |
| WO | 2011/156215 A3 | 4/2012 |
| WO | 2016/134243 A2 | 8/2016 |
| WO | 2017/003762 A1 | 1/2017 |

OTHER PUBLICATIONS

PCT/US2018/000175, International Search Report and Written Opinion dated Jan. 23, 2019.
PCT/US2018/000175, International Preliminary Report on Patentability dated Feb. 18, 2020.

* cited by examiner

US 11,376,833 B2

1

PROCESS TO FORM A TILE USING LOW TEMPERATURE HEAT LAMINATION

REFERENCE TO RELATED APPLICATIONS

This application claims the benefit of priority to U.S. Provisional Application No. 62/546,178, filed on Aug. 16, 2017.

BACKGROUND

Conventional resilient (flexible) floor tiles are typically composed of a highly filled base layer, situated beneath a décor film, which is, in turn, covered by a clear wear layer, which is covered by a top coat. Currently, these conventional tiles use vinyl polymers, such as polyvinyl chloride (PVC), as a primary component in the various layers described above. Typically the "PVC formulations" contain plasticizers to render the PVC more flexible. However, there are environmental issues relating to plasticizer release (both during manufacture and end-use of the tile). Also, "plasticized PVC" typically has poor recyclability, and it cannot be easily reprocessed. Also, PVC tiles, when burned, emit hazardous halogen containing products of combustion, such as hydrogen chloride. Also, for non-PVC tiles, typically tie layers or high temperature lamination is needed to bond the layered sections of a tile together; for example wear layer to décor layer, or décor layer to base layer. Additional tie layers add material cost, require extra process steps, and lead to increases in the overall cost to manufacture the tile. Also, high lamination temperatures can cause shrinkage of tile components and curling of the tile.

Processes to manufacture tiles, tile configurations and/or lamination processes are described in the following references: U.S. Pat. Nos. 9,359,773, 7,426,568, 5,158,641, US2015/0165748, US2012/0148849, US2008/0026197, US2007/0059515, US2002/015527, EP2878440A, EP955158A2, EP433060A2, EP0868995A2, EP1129844A1, WO2011/156215, WO2008/103887, WO2015/140682, WO2001/051724, GB2310631A, TW201416527A, JP1214429(Abstract), and International Application PCT/US16/038517, tiled Jun. 21, 2016.

However, there remains a need for improved floor tiles that will eliminate, or significantly reduce emissions during their manufacture, end-use, or combustion. In addition, the décor film of the tile should be easily bonded to the wear layer and to the base layer, with good adhesion, and without deteriorating the tile structure. There is a further need for such a tile that can be readily recycled or reprocessed. These needs have been met by the following invention.

SUMMARY OF THE INVENTION

A method to produce a tile comprising at least the following layered sections: a wear layered section, a décor layered section and a base layered section; and
 wherein the wear layered section comprises the following:
  A) a compositional layer A formed from a composition A comprising at least one olefin-based polymer;
 wherein the décor layered section comprises the following:
  B1) a compositional layer B1 formed from a composition B1 comprising a propylene-based polymer;
  B2) a compositional layer B2 formed from a composition B2 comprising an olefin-based polymer;
 wherein the base layered section comprises the following:

2

C) a compositional layer C formed from a composition C comprising an olefin-based polymer;
 wherein the method comprises the following step(s):
  i) heat laminating compositional layer A to compositional layer B1, at a temperature T1≤140° C.; and
   wherein, for a continuous production of the tile, T1 is the temperature at the surface of the compositional layer with the highest, or equivalent, surface temperature; and for a batch production of the tile, T1 is the interfacial temperature between the two compositional layers;
  ii) heat laminating compositional layer B2 to compositional layer C, at a temperature T2≤140° C.; and
   wherein, for a continuous production of the tile, T2 is the temperature at the surface of the compositional layer with the highest, or equivalent, surface temperature; and for a batch production of the tile, T2 is the interfacial temperature between the two compositional layers.

BRIEF DESCRIPTIONS OF THE DRAWINGS

FIG. 1 depicts an example tile containing a wear layered section, a décor layered section and a base layered section. As seen in this figure, there is no tie layer at the interface between the wear layered section and the décor layered section, and no tie layer at the interface between décor layered section and base layered.

Figure 2:
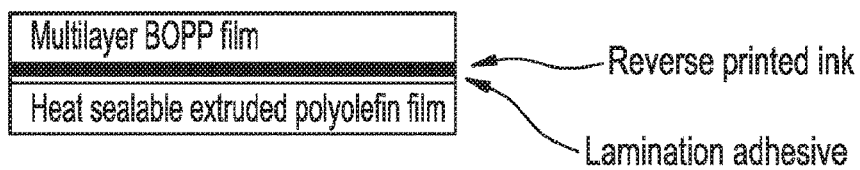
Figure 3:
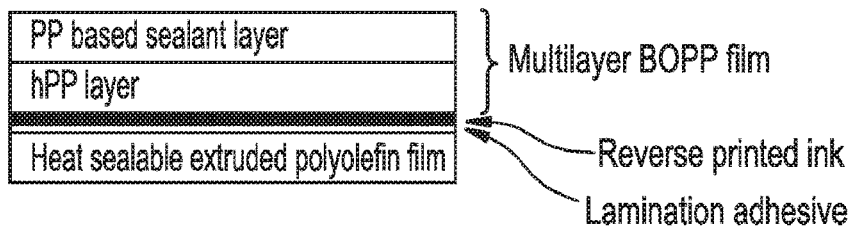
Figure 4:
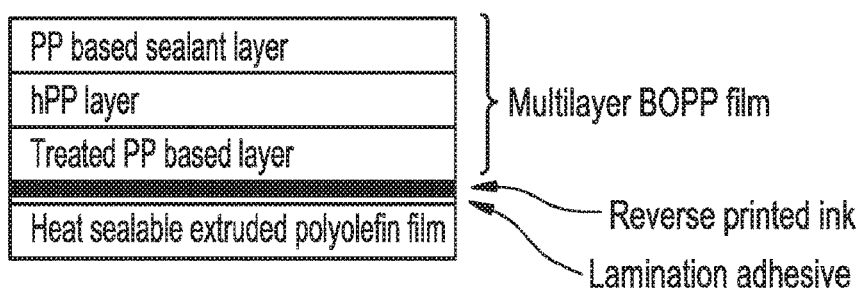
Figure 5:
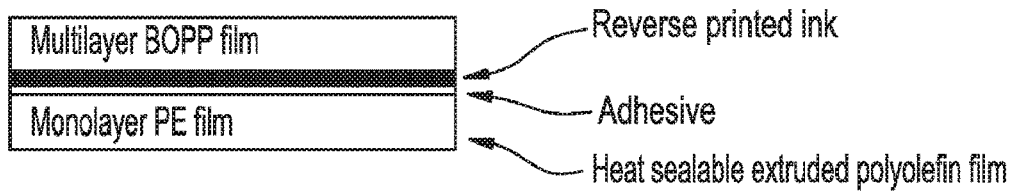
Figure 6:
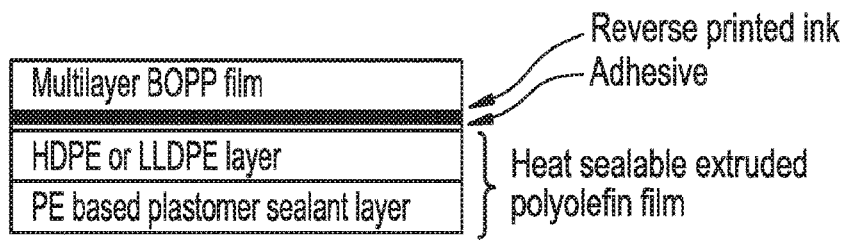
Figure 7:
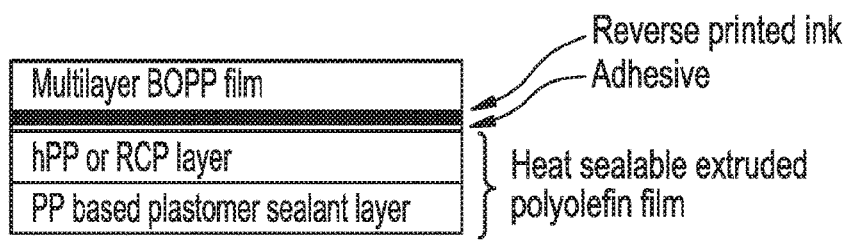
Figure 8:
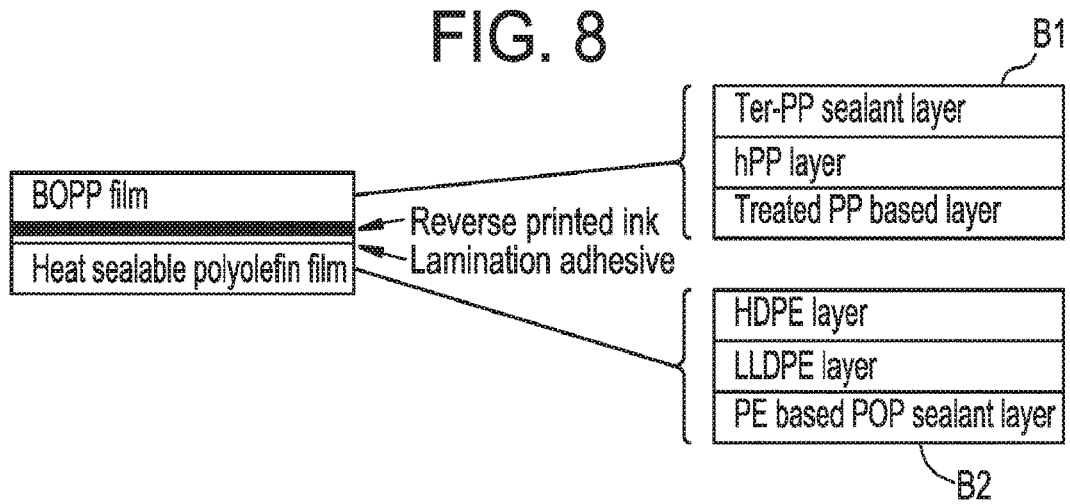
Figure 9:
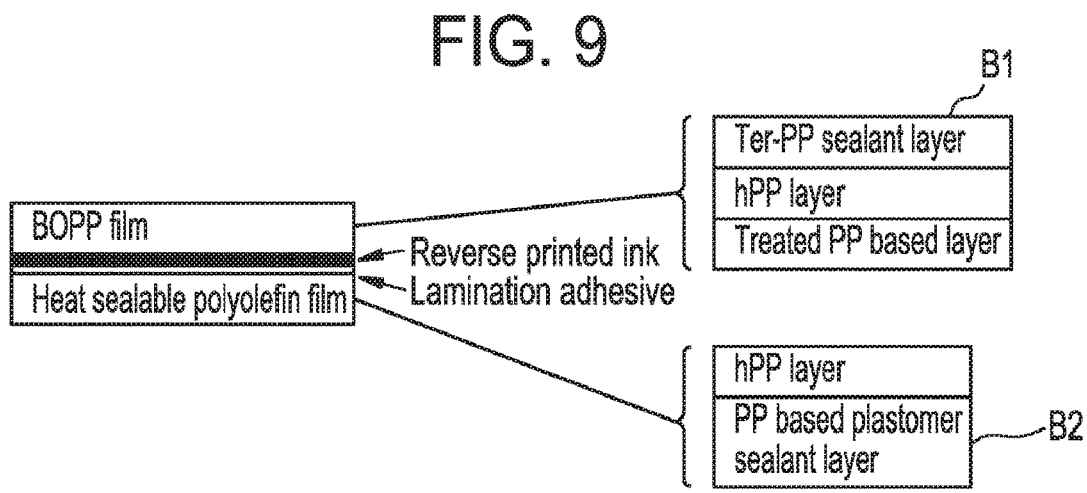

FIG. 2 depicts a décor layered section. FIG. 3 depicts a décor layered section, in which the BOPP that has two layers. FIG. 4 depicts a décor layered section, in which the BOPP has three layers. FIG. 5 depicts a décor layered section, in which the heat sealable olefin-based film that is a monolayer PE film. FIG. 6 depicts a décor layered section, in which the heat sealable olefin-based film has two layers (PE-based). FIG. 7 depicts a décor layered section, in which the heat sealable olefin-based film has two layers (PP-based). FIG. 8 depicts a décor layered section, in which the BOPP that has three layers and heat sealable olefin-based film has three layers (PE-based). FIG. 9 depicts a décor layered section, in which the BOPP that has three layers and heat sealable olefin-based film has two layers (PP-based).

Figure 10:
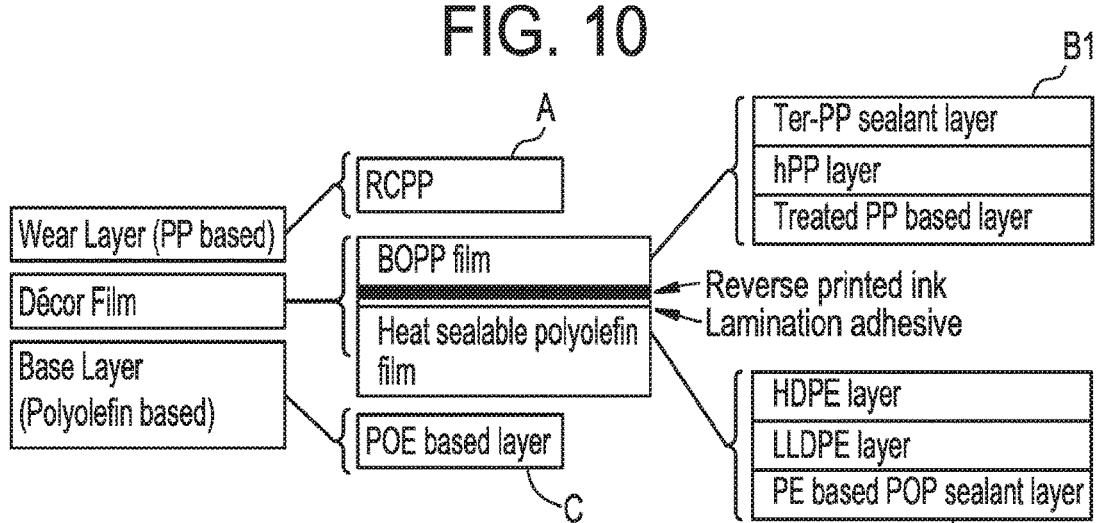
Figure 11:
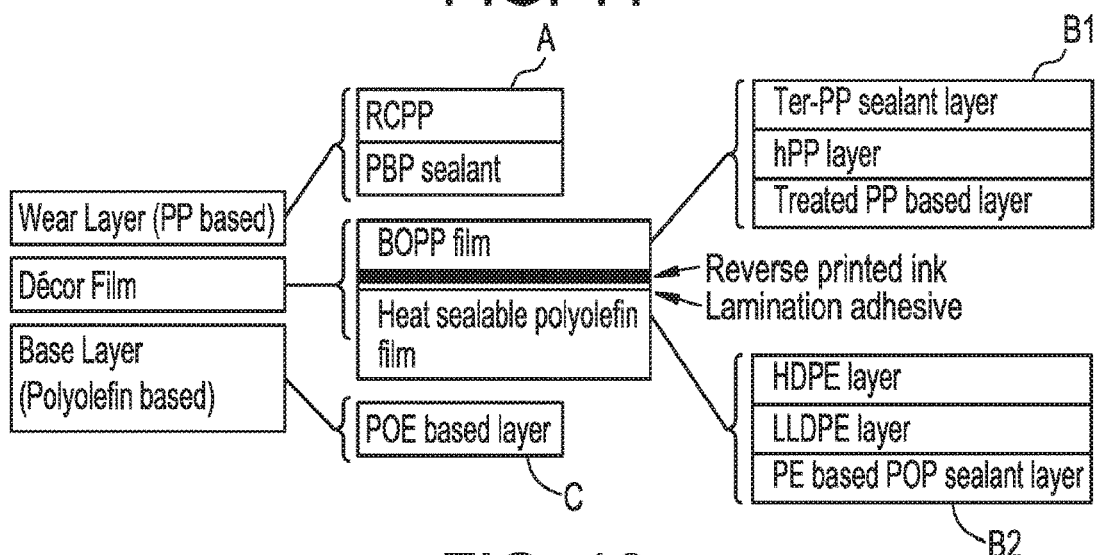
Figure 12:
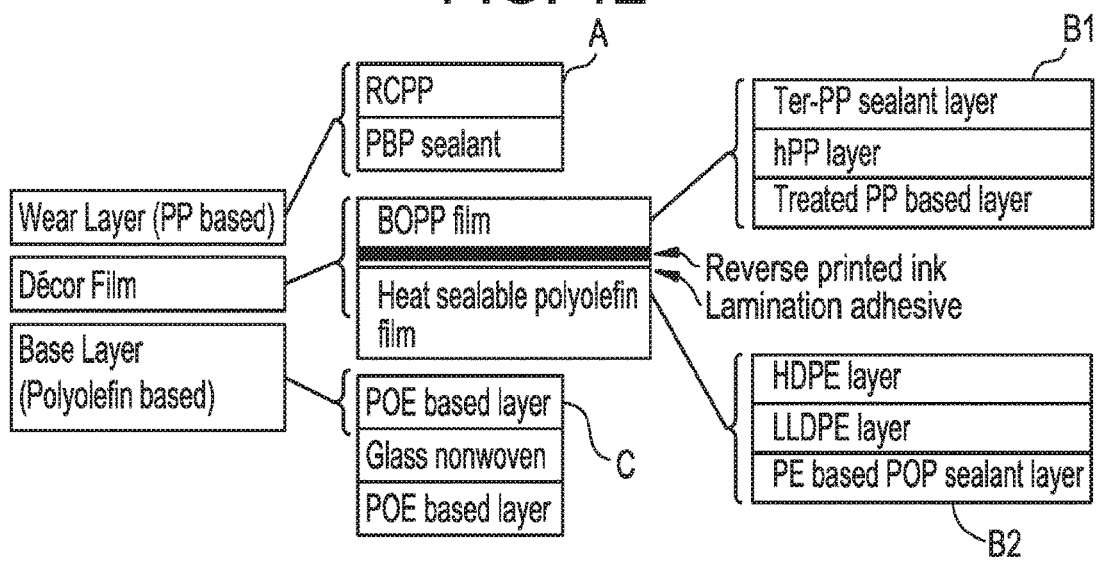
Figure 13:
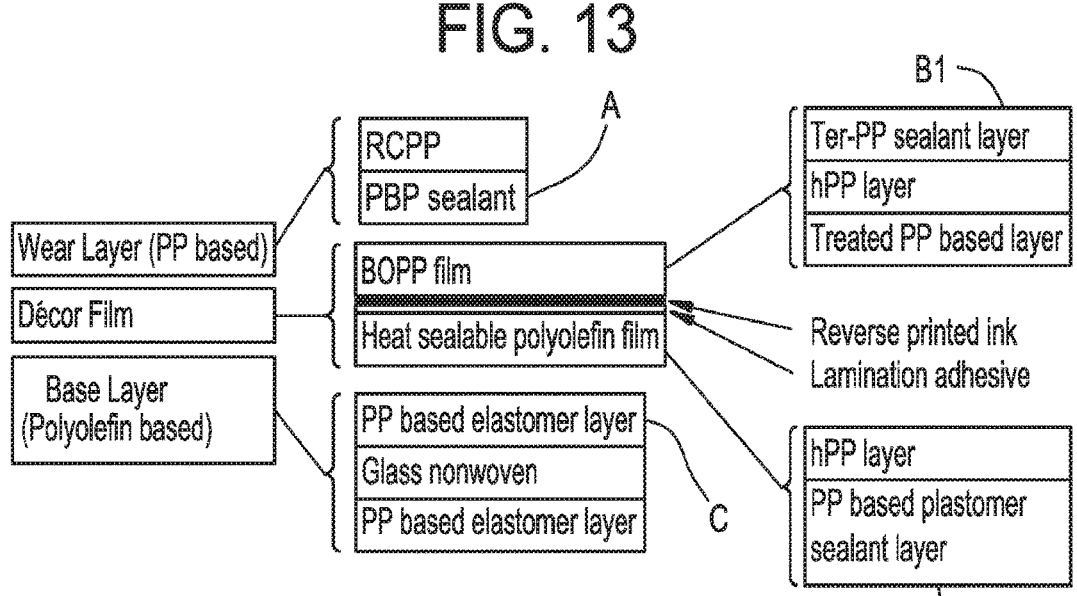
Figure 14:
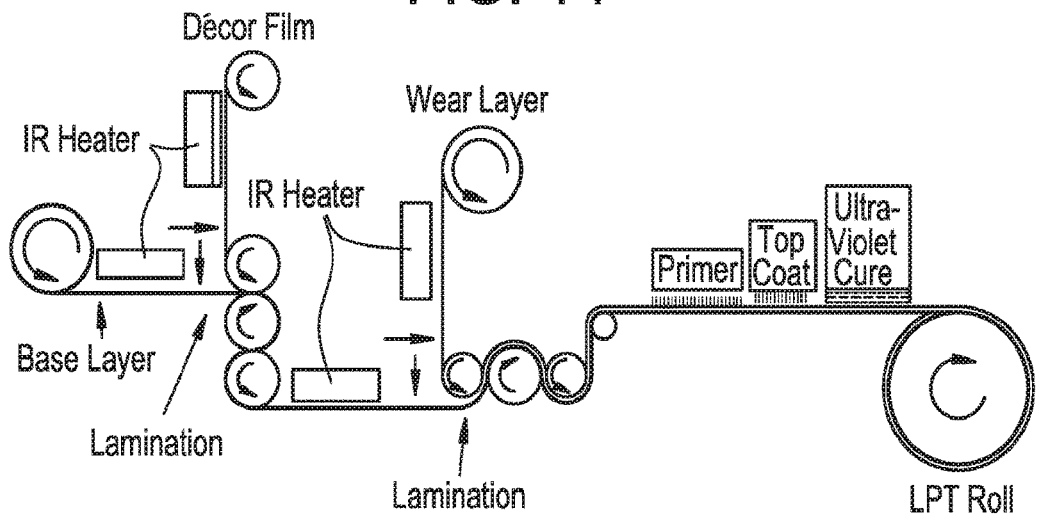
Figure 15:
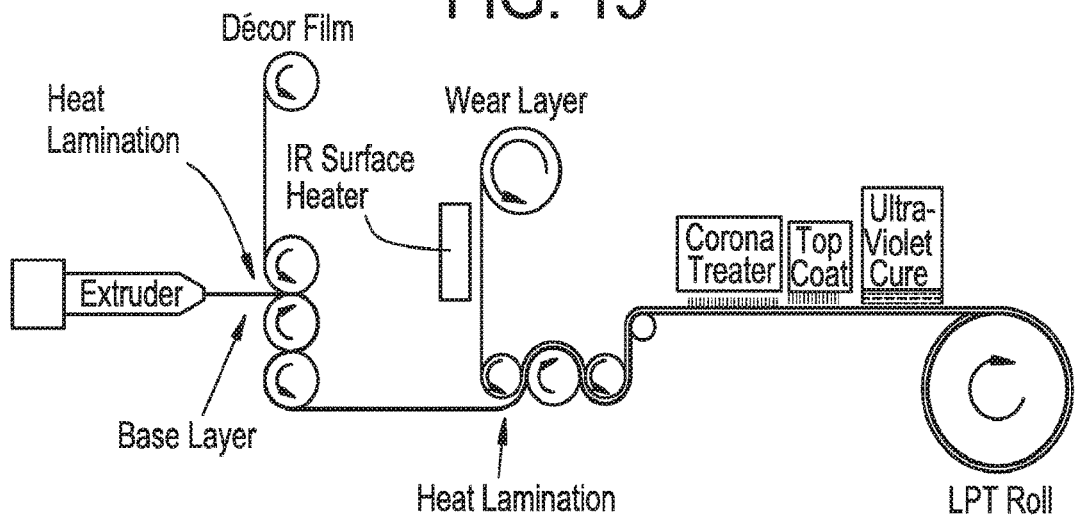
Figure 16:
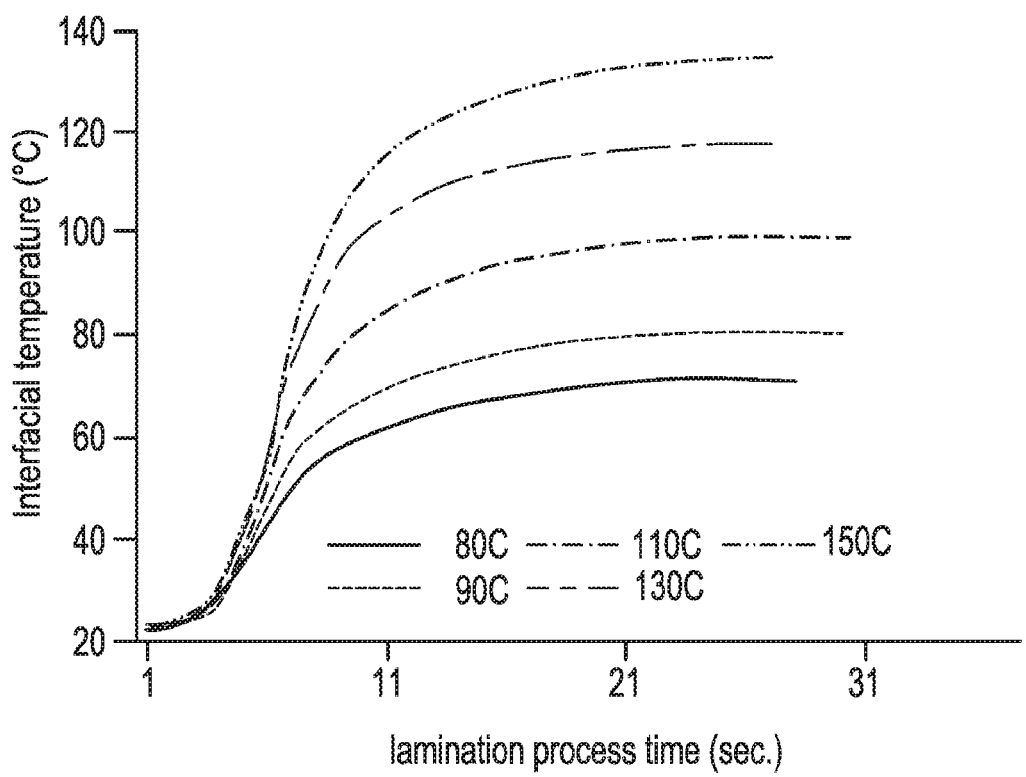
Figure 17:
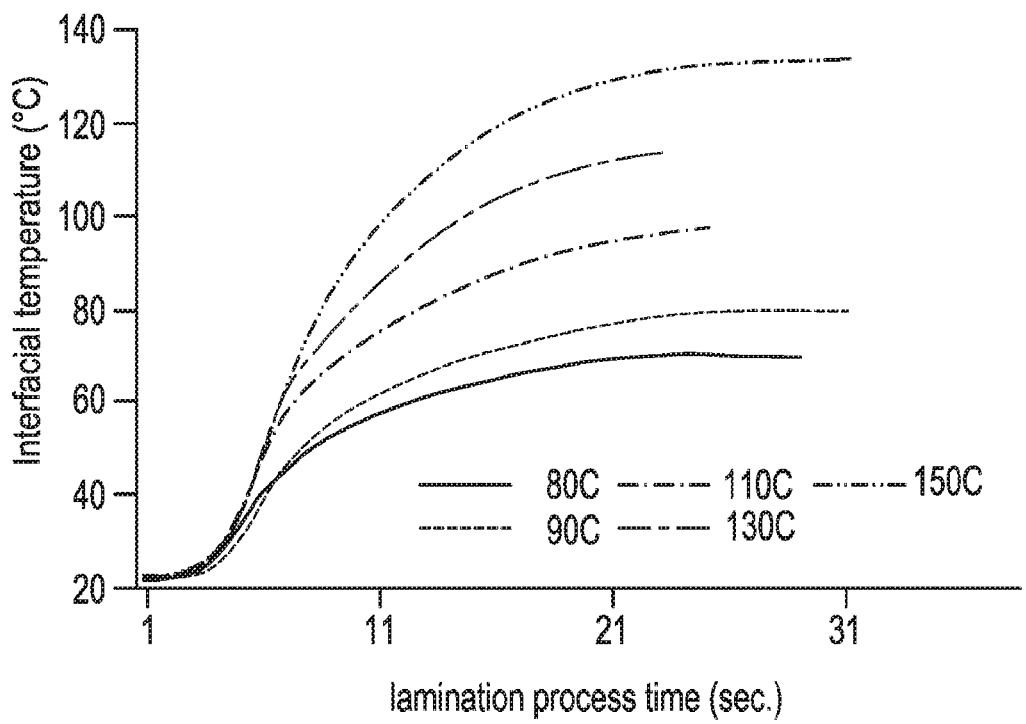
Figure 18:
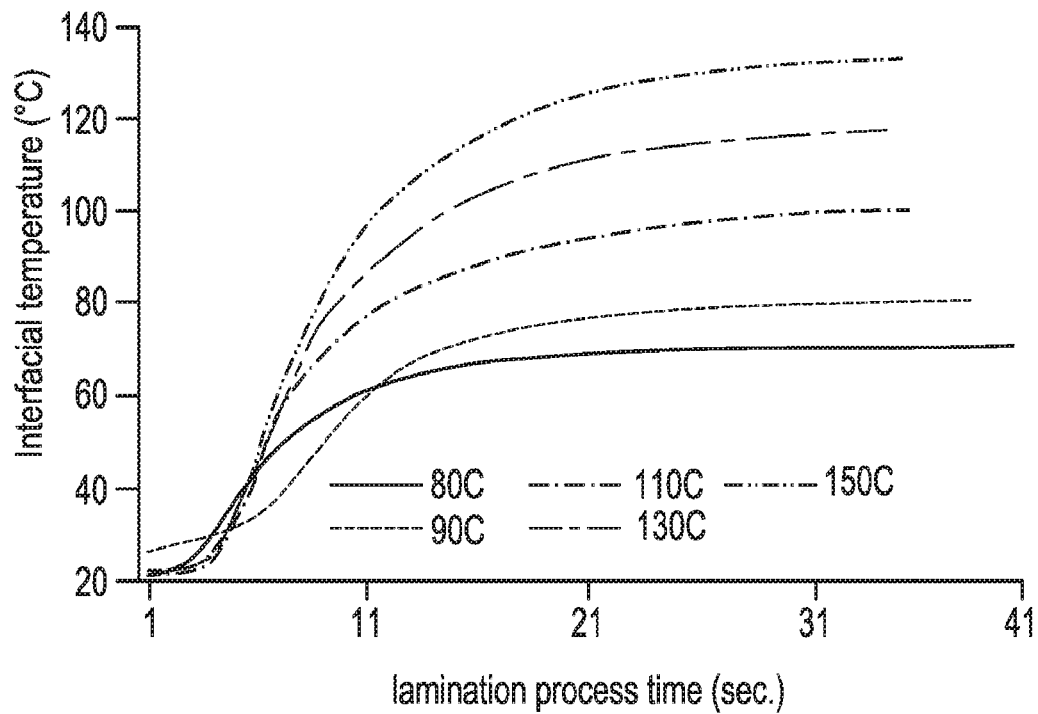

FIG. 10 depicts a tile, in which the wear layered section is a monolayer, the décor layered section is the same as in FIG. 8, and the base layered section is a monolayer. FIG. 11 depicts a tile, in which the wear layered section has two layers, the décor layered section is the same as in FIG. 8, and the base layered section is a monolayer. FIG. 12 depicts a tile, in which the wear layered section has two layers, the décor layered section is the same as in FIG. 8, and the base layered section has a sandwich structure (POE based layer/glass nonwoven/POE based layer). FIG. 13 depicts a tile, in which the wear layered section has two layers, the décor layered section is the same as in FIG. 8, and the base layered section has a sandwich structure (PP based layer/glass nonwoven/PP based layer). FIG. 14 depicts a continuous commercial production of the tile. FIG. 15 depicts a continuous commercial production of the tile, which uses an extruder for forming the base layered section. FIG. 16 demonstrates the T1 profile at different plate temperatures. FIG. 17 demonstrates the T2 profile at different plate temperatures. FIG. 18 demonstrates the T1/T2 profile during a tile lamination at different plate temperatures.

Figure 19:
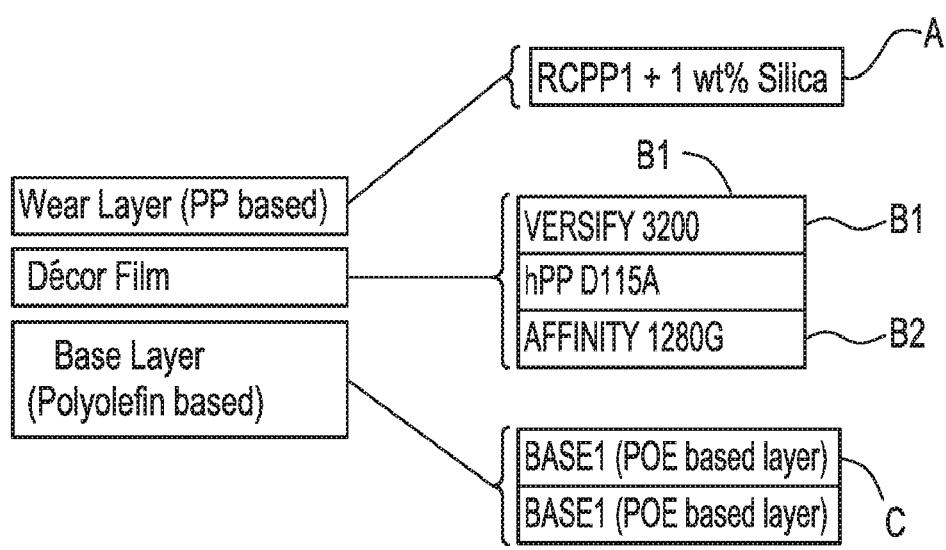
Figure 20:
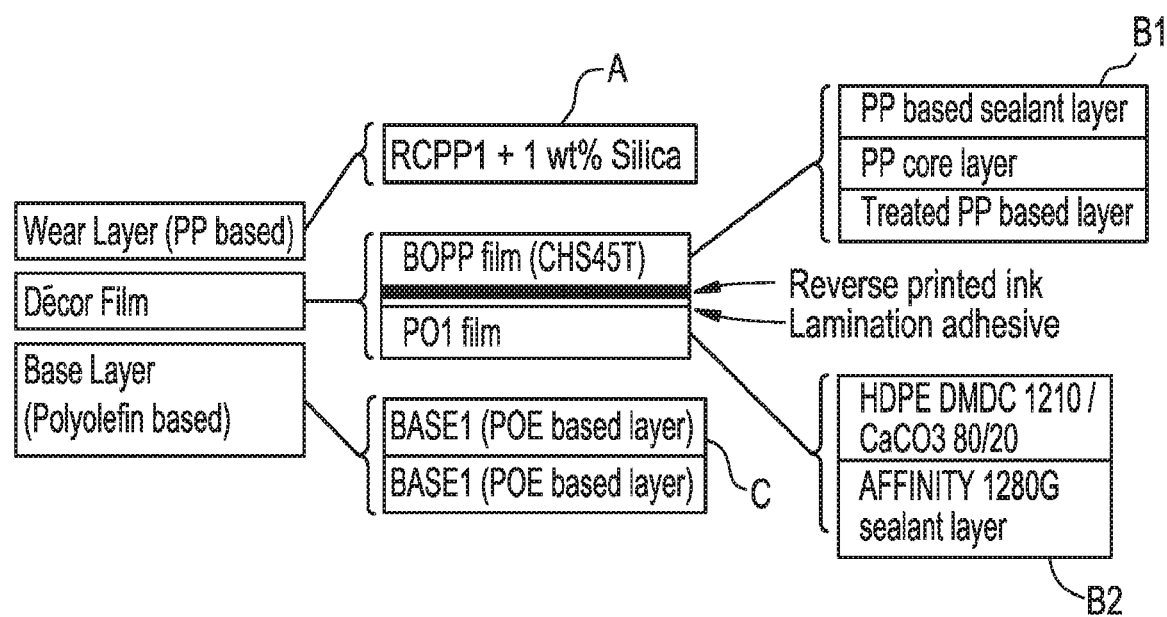

FIG. 19 depicts the structure of Inventive Tile 1. FIG. 20 depicts the structure of Inventive Tile 2.

DETAILED DESCRIPTION

A new method to form a tile has been discovered, resulting in a new tile structure. The method uses heat lamination at low temperatures, and avoids the use of tie layers between the wear layered section and the décor layered section, and the use of tie layers between the décor layered section and the base layered section.

A method to produce a tile comprising at least the following layered sections: a wear layered section, a décor layered section and a base layered section; and wherein the wear layered section comprises the following:

A) a compositional layer A formed from a composition A comprising at least one olefin-based polymer;

wherein the décor layered section comprises the following:

B1) a compositional layer B1 formed from a composition B1 comprising a propylene-based polymer;

B2) a compositional layer B2 formed from a composition B2 comprising an olefin-based polymer;

wherein the base layered section comprises the following:

C) a compositional layer C formed from a composition C comprising an olefin-based polymer;

wherein the method comprises the following step(s):

i) heat laminating compositional layer A to compositional layer B1, at a temperature T1≤140° C.; and wherein, for a continuous production of the tile, T1 is the temperature at the surface of the compositional layer with the highest, or equivalent, surface temperature; and for a batch production of the tile, T1 is the interfacial temperature between the two compositional layers;

ii) heat laminating compositional layer B2 to compositional layer C, at a temperature T2≤140° C.; and wherein, for a continuous production of the tile, T2 is the temperature at the surface of the compositional layer with the highest, or equivalent, surface temperature; and for a batch production of the tile, T2 is the interfacial temperature between the two compositional layers.

The above method may comprise a combination of two or more embodiments described herein.

The tile comprises three layered sections: a wear layered section, a décor layered section and a base layered section. Each of these layered sections may comprise one or more compositional layers.

Each layered section may comprise a combination of two or more embodiments described herein.

In one embodiment, for step i), T1≤135° C., or ≤130° C., or ≤125° C., or ≤120° C., or ≤115° C. In one embodiment, for step i), T1≥80° C., or ≥85° C., or ≥90° C., or ≥95° C., or ≥100° C.

In one embodiment, for step i) the heat lamination occurs at a pressure ≥10 psi, or ≥15 psi, or ≥20 psi. In one embodiment, the heat lamination occurs at a pressure from 10 psi to 100 psi, or 15 psi to 90 psi, or 20 psi to 80 psi. In one embodiment, the heat lamination occurs at a pressure from 30 psi to 100 psi, or 40 psi to 90 psi, or 50 psi to 80 psi.

In one embodiment, for step ii), T2≤135° C., or ≤130° C., or ≤125° C., or ≤120° C., or ≤115° C. In one embodiment, for step ii), T2≥80° C., or ≥85° C., or ≥90° C., or ≥95° C., or ≥100° C.

In one embodiment, for step ii) the heat lamination occurs at a pressure ≥10 psi, or ≥15 psi, or ≥20 psi. In one embodiment, the heat lamination occurs at a pressure from 10 psi to 100 psi, or 15 psi to 90 psi, or 20 psi to 80 psi. In one embodiment, the heat lamination occurs at a pressure from 30 psi to 100 psi, or 40 psi to 90 psi, or 50 psi to 80 psi.

In one embodiment, step i) occurs before step ii).

In one embodiment, step i) and step ii) occur simultaneously.

In one embodiment, step ii) occurs before step i).

In one embodiment, the ABS(T1−T2)≤40° C., or ≤30° C., or ≤20° C., wherein ABS(T1−T2) is the absolute difference in temperature between T1 and T2.

In one embodiment, the olefin-base polymer in composition layer B2, has a Tm≤120° C., or ≤115° C., or ≤110° C., or ≤105° C., or ≤100° C.

In one embodiment, there is no tie layer at the interface between the wear layered section and the décor layered section, and no tie layer at the interface between décor layered section and base layered.

In one embodiment, the propylene-based polymer in composition B1, is a propylene-based interpolymer (for example, a propylene/ethylene interpolymer or copolymer; or a propylene/C4-C8 alpha-olefin interpolymer of copolymer). In a further embodiment, the interpolymer is unoriented.

In one embodiment, composition B1 comprises ≥90 wt %, or ≥95 wt %, or ≥98 wt %, of the propylene-based polymer, based on the weight of composition B1.

In one embodiment, the olefin-based polymer in composition A, is an ethylene-based polymer.

In one embodiment, the olefin-based polymer in composition A, is a propylene-based polymer.

In one embodiment, composition A comprises ≥90 wt %, or ≥95 wt %, or ≥98 wt %, of the olefin-based polymer, based on the weight of composition A.

In one embodiment the tile comprises ≤1.0 wt %, or ≤0.5 wt %, or ≤0.1 wt % of a polyester, based on the weight of the tile.

In one embodiment the tile comprises ≤1.0 wt %, or ≤0.5 wt %, or ≤0.1 wt % of an ethylene vinyl acetate copolymer, based on the weight of the tile.

In one embodiment the tile comprises ≤1.0 wt %, or ≤0.5 wt %, or ≤0.1 wt % of a polyvinyl chloride, based on the weight of the tile.

In one embodiment the tile comprises ≤1.0 wt %, or ≤0.5 wt %, or ≤0.1 wt % of a polyurethane, based on the weight of the tile.

In one embodiment the tile comprises ≤1.0 wt %, or ≤0.5 wt %, or ≤0.1 wt % of a fluorinated olefin-based polymer (for example, tetrafluoropropylene homopolymer, tetrafluoroethylene homopolymer, or a copolymer of a tetrafluoropropylene and tetrafluoroethylene), based on the weight of the tile.

In one embodiment the tile comprises ≤1.0 wt %, or ≤0.5 wt %, or ≤0.1 wt %, based on the weight of the tile, of one or more of the following polymers: ethylene vinyl acetate copolymer, polyvinyl chloride, polyvinyl dichloride, polystyrene, a polyamide, a polycarbonate, ethylene acrylic acid copolymer, a polymer comprising polymerized styrene.

In one embodiment, the tile comprises ≤5 wt %, or ≤4 wt %, or ≤3 wt %, or ≤2 wt % of an anhydride grafted and/or carboxylic acid grafted polymer (for example, a grafted ethylene-based polymer or a grafted propylene-based polymer), based on the weight of the tile. In a further embodiment, the anhydride grafted and/or carboxylic acid grafted polymer is an anhydride grafted and/or carboxylic acid grafted olefin-based polymer (for example, a grafted ethylene-based polymer or a grafted propylene-based polymer). In one embodiment, the tile comprises ≥0.1 wt %, or ≥0.2 wt %, or ≥0.5 wt %, or ≥1 wt % of an anhydride grafted and/or carboxylic acid grafted polymer (for example, a grafted ethylene-based polymer or a grafted propylene-based polymer), based on the weight of the tile. In a further embodiment, the anhydride grafted and/or carboxylic acid grafted polymer is an anhydride grafted and/or carboxylic acid grafted olefin-based polymer (for example, a grafted ethylene-based polymer or a grafted propylene-based polymer).

In one embodiment, the tile comprises ≤10 wt %, or ≤9 wt %, or ≤8 wt %, or ≤7 wt %, or ≤6 wt %, or ≤5 wt %, or ≤4 wt % of a tackifier (for example, Eastman's REGALITE R1090 or EASTOTAC H130R), based on the weight of the tile. In one embodiment, the tile comprises ≥0.1 wt %, or ≥0.2 wt %, or ≥0.5 wt %, or ≥1 wt % of a tackifier (for example, Eastman's REGALITE R1090 or EASTOTAC H130R), based on the weight of the tile.

In one embodiment, the tile comprises ≤1.0 wt %, or ≤0.5 wt %, or ≤0.1 wt % of a slip agent (for example, oleamide and erucamide), based on the weight of the tile.

In one embodiment, the tile comprises ≤1.0 wt %, or ≤0.5 wt %, or ≤0.1 wt % of an ant blocking agent (for example, silicon dioxide), based on the weight of the tile.

In one embodiment, the tile comprises ≤1.0 wt %, or ≤0.5 wt %, or ≤0.1 wt % of a metal foil (for example, an aluminum foil), based on the weight of the tile.

In one embodiment the tile comprises ≤10.0 wt %, or ≤5.0 wt %, or ≤2.0 wt %, or ≤1.0 wt %, or ≤0.5 wt %, or ≤0.1 wt %, based on the weight of the tile, of a foam (for example, a foamed polymer composition).

In one embodiment, the tile has a total thickness ≥2.0 mm, or ≥2.5 mm, or ≥3.0 mm, or ≥3.5 mm. In one embodiment, the tile has a total thickness ≤8.0 mm, or ≤7.0 mm, or ≤6.0 mm, or ≤5.0 mm. In one embodiment, the tile has a thickness from 2.0 mm to 5.0 mm. Note, 1 mm=39.4 mils; and 1 mm=1000 microns.

In one embodiment, the tile has a total thickness from 80 to 150 mils, or from 80 to 120 mils, or from 80 to 100 mils.

In one embodiment, each layered section, except the décor layered section, has a thickness ≥20 mils (508 microns), or ≥30 mils (762 microns), or ≥40 mils (1016 microns). In a further embodiment, décor layered section has a thickness ≥10 microns, or ≥15 microns, or ≥20 microns.

In one embodiment, each layered section, except the décor layered section, has a thickness ≤197 mils (5000 microns), or ≤157 mils (4000 microns), or ≤118 mils (3000 microns). In a further embodiment, décor layered section has a thickness ≤4 mils (101.6 microns), or ≤3 mils (76.2 microns), or ≤2 mils (50.8 microns), or ≤1.5 mils (38.1 microns).

In one embodiment, the décor layered section comprises of a reverse printed, film formed from a composition comprising an oriented propylene-based polymer, and a film formed from a composition comprising an olefin-based polyolefin film. In a further embodiment, the base layered section comprises a compositional section formed from a composition comprising an olefin-based polymer that has a Tm<100° C. In a further embodiment, this compositional layer is layer C.

In one embodiment, the wear layered section comprises a film formed from a composition comprising a propylene-based polymer, which has a MFR from 0.5 to 30.0 g/10 min, or from 1.0 to 25.0 g/10 min (230° C./2.16 kg). In a further embodiment, this compositional layer is layer A.

In one embodiment, there is no adhesive between the last compositional layer of the wear layered section and the first compositional layer of décor layered section; and no adhesive between the last compositional layer of the décor layered section and first compositional layer of the based layered section.

In one embodiment, the method does not comprise a vacuum forming process. A vacuum forming process comprises the application of a vacuum in at least one step in the tile production.

In one embodiment, the method comprises no additional heat lamination steps occur, in addition to steps i) and ii).

In one embodiment, the method is a batch production of the tile.

In one embodiment, the method is a continuous production of the tile.

In one embodiment, in each of steps i) and ii), at least one IR heater is used to heat the layered section surface above its melting point.

In one embodiment, in each of steps i) and ii), the heat lamination is completed in ≤5 seconds, or ≤4 seconds, or ≤3 seconds.

In one embodiment, no primer is used on the surface of the compositional layer C of the base layered section, and no primer is used on the surface of the compositional layer B2 of the décor layered section.

In one embodiment, no adhesive is used on the surface of the compositional layer C of the base layered section, and no adhesive is used on the surface of the compositional layer B2 of the décor layered section.

In one embodiment, the method does not use a flame lamination process.

Also is provided a tile formed from the process of any one or more of the above embodiments.

In one embodiment, the thickness of the base layered section is greater than the thickness of the wear layered section. In a further embodiment, the thickness of the base layered section is greater than the thickness of the décor layered section.

In one embodiment, the thickness of the base layered section is greater than the sum of the thickness of the wear layered section and the thickness of the décor layered section.

Also is provided a flooring structure comprising the tile.
Also is provided a roofing structure comprising the tile.
Also is provided a building structure comprising the tile.

Wear Layered Section

In one embodiment, the olefin-based polymer of composition A is a propylene-based polymer. In a further embodiment, the composition A comprises ≥50 wt %, or ≥60 wt %, or ≥70 wt %, or ≥80 wt %, or ≥85 wt %, or ≥90 wt %, or ≥95 wt %, or ≥98 wt % of the propylene-based polymer, based on the weight of composition A.

In one embodiment, the olefin-based polymer of composition A is an ethylene-based polymer. In a further embodiment, the composition A comprises ≥50 wt %, or ≥60 wt %, or ≥70 wt %, or ≥80 wt %, or ≥85 wt %, or ≥90 wt %, or ≥95 wt %, or ≥98 wt % of the ethylene-based polymer, based on the weight of composition A.

In one embodiment, there is no tie layer and no adhesive between the compositional layer A of the wear layered section, and the compositional layer B1 of the décor layered section.

In one embodiment, the wear layer section has a transparency ≥50%, or 60%, or 70%.

In one embodiment, a top coat is applied to the exposed surface of the wear layered section. In a further embodiment, the top coat is formed from a composition comprising a polyurethane.

In one embodiment the thickness of the wear layer ranges from 6 mils to 40 mils, preferably 10 to 30 mils, more preferably 15 to 25 mils.

Décor Layered Section

In one embodiment, the décor layered section comprises a compositional layer B1 formed from a composition B1 comprising a majority wt % of an olefin-based polymer, based on the weight of composition B1. In one embodiment, the olefin-based polymer of composition B1 is a propylene-based polymer. In a further embodiment, the olefin-based polymer of composition B1 has a Tm≤120° C., or ≤115° C., or ≤110° C., or ≤105° C., or ≤105° C. The compositional layer B1 will be heat bonded to the compositional layer A (bottom surface) of the wear layered section.

In one embodiment, the décor layered section comprises a compositional layer B2 formed from a composition B2 comprising a majority wt % of an olefin-based polymer, based on the weight of composition B2. In one embodiment, the olefin-based polymer of composition B2 is an ethylene-based polymer. In one embodiment, the olefin-based polymer of composition B2 is a propylene-based polymer. In a further embodiment, the olefin-based polymer of composition B2 has a Tm≤120° C., or ≤115° C., or ≤110° C., or ≤105° C., or ≤105° C. The compositional layer B2 will be heat bonded to the compositional layer C (top surface) of the base layered section.

In a further embodiment, the décor layered section comprises a multilayered BOPP film comprising a sealant layer. In a further embodiment, the compositional layer B1 is the sealant layer of the multilayered BOPP film. In a further embodiment, the sealant layer (compositional layer B1) is a PP-based sealant layer. In a further embodiment, the multilayered BOPP film has 3 compositional layers composed of: PP-based sealant layer/hPP layer/treated PP layer, where the compositional layer B1 is the PP sealant layer. The PP sealant layer (compositional layer B1) may be a ter-PP. ADSYL 5C30F and ADSYL 6C30F, available from LyondellBasell, may be used as ter-PP for the sealant layer (compositional layer B1) material. Alternatively, the sealant layer (compositional layer B1) may be COSMOPLENE FL7641L, a ter-PP supplied by The Polyolefin Company (TPC), Singapore. Alternatively, the sealant layer (compositional layer B1) may be random copolymer PP, such as RCP DS6D82, having a broad melting peak between 100 to 120° C. and a peak temperature of 133° C., as supplied by Braskem. Alternatively, the sealant layer (compositional layer B1) may be PP based plastomer, such as VERSIFY 3000, having a melting peak of 104° C., as supplied by The Dow Chemical Company. The hPP layer, which is the bulk layer (core) in the multilayered BOPP film, may be selected from homopolymer polypropylene, such as hPP MOPLEN HP522H, 2.0 MFR, available from LyondellBasell Industries; hPP T28FE, 2.8 MFR, available from LyondellBasell Industries; and hPP 4712E1, 2.8 MFR, available from ExxonMobil. The treated PP layer may be made from hPP, ter-PP or random copolymer PP.

Such multilayered BOPP films can be purchased from a BOPP manufacturer as a heat sealable BOPP film. Suitable examples are CHS series and NWP series sealable BOPP films from Inteplast Group, TORAYFAN F62W series (range of thicknesses) sealable BOPP films from Toray Plastics (America) Inc., and PG BTF series, TSS series, and TSY series sealable BOPP films from Impex Global, LLC. Suitable sealable BOPP films can also be obtained from Foshan Plastics Group Co., Hainan Shiner Industrial Co., and Shanghai Yilv Packaging Material Company.

The multilayered BOPP film comprising compositional layer B1 ranges from 10 to 100 um, more preferably 15 to 80 um, and more preferably 15 to 60 um.

In one embodiment, the multilayered BOPP film comprising the compositional layer B1 is corona treated or plasma treated. The treatment is treated on the treated PP layer side, bringing the surface tension up to 42 Dynes. In a further embodiment, the multilayered BOPP film comprising the compositional layer B1 is reverse printed on the treated side. Reverse printing is the process of printing on the back side of a clear substrate, sometimes referred to as subsurface printing, with a reverse image. This is useful, as the print is protected from damage caused by environmental factors (such as humidity and exposure to light) and abrasion. More importantly, by using the reverse printing, the sealant compositional layer B1 of the multilayered BOPP film structure is available for heat lamination to the bottom surface of wear layer. Otherwise, heat laminating to a surface printed ink, with an "olefin-based compositional layer" of the wear layered section, is problematic. Two printing methods, gravure process or flexographic process, and a nitrocellulose (NC)/polyurethane resins based ink, can be used.

In one embodiment, the décor layered section comprises a reverse print layer comprising a printed ink pattern, and wherein this reverse print layer is located between compositional layer B1 and compositional layer B2. In a further embodiment, the décor layered section comprising a reverse print layer is laminated using an adhesive (for example, a polyurethane adhesive) to compositional layer B2. Suitable adhesives include ADCOTE 577 (70 wt % solids)/ADCOTE 577B (71 wt % solids) or ADCOTE 577/L87-124. All ADCOTE products are supplied by The Dow Chemical Company. The adhesive system is diluted to 32 wt % solids with Ethyl Acetate. Alternatively, the lamination is done using solvent-less adhesive lamination, for instance, MOR-FREE Solventless Adhesives L75-191/CR 85.

In a further embodiment, the compositional layer B2 is a film fabricated from an olefin-based polymer. In one embodiment, the film comprising compositional layer B2 is a monolayer film. In another embodiment, the film comprising compositional layer B2 is a multilayer film comprising a sealant compositional layer as B2. The sealant compositional layer B2 has a Tm≤120° C., more preferably ≤110° C., and more preferably ≤100° C. The polyolefin film comprising compositional layer B2 can be coextruded via a cast film process or blown film process. Alternatively, the polyolefin film comprising compositional layer B2 can be laminated together. The compositional layer B2 will be heat bonded to the compositional layer C (top surface) of the base layered section. The thickness of the polyolefin film comprising compositional layer B2 ranges from 10 to 100 um, and more preferably 20 to 80 um.

In one embodiment, the décor layered section comprises a reverse print layer comprising a printed ink pattern. In a further embodiment, the ink pattern in not in contact with any compositional layer of the wear layered section or base layered section.

In one embodiment, the décor layered section comprises a reverse print layer comprising a printed ink pattern, and wherein the reverse print layer is embossed.

In one embodiment, there is no tie layer and no adhesive between the compositional layer B2 of the décor layered section and the compositional layer C of the base layered section.

The overall thickness of the décor layered section comprising compositional layers B1 and B2 ranges from 20 to 200 um, more preferably 35 to 160 um, and more preferably 50 to 140 um.

Base Layered Section

In one embodiment, the olefin-based polymer of composition C is a propylene-based polymer. In a further embodiment, the propylene-based polymer has a Tm≤100° C. In a further embodiment, the composition C comprises ≥50 wt %, or ≥60 wt %, or ≥70 wt %, or ≥80 wt %, or ≥85 wt %, or ≥90 wt %, or ≥95 wt %, or ≥98 wt % of the propylene-based polymer, based on the weight of composition C.

In one embodiment, the olefin-based polymer of composition C is an ethylene-based polymer. In a further embodiment, the ethylene-based polymer has a Tm≤100° C. In a further embodiment, the composition C comprises ≥50 wt %, or ≥60 wt %, or ≥70 wt %, or ≥80 wt %, or ≥85 wt %, or ≥90 wt %, or ≥95 wt %, or ≥98 wt % of the ethylene-based polymer, based on the weight of composition C.

In one embodiment, the thickness of the base layered section is ≥1.0 mm, or ≥1.1 mm, or ≥1.2 mm. In one embodiment, the thickness of the base layered section is ≤6.0 mm, or ≤5.0 mm, or ≤3.0 mm. In one embodiment, the thickness of the base layered section is from 1.0 mm to 6.0 mm, or from 1.5 mm to 5.0 mm, or from 2.0 mm to 4.0 mm. In one embodiment, the thickness of the base layered section comprises ≥20%, or ≥25%, or ≥30%, or ≥35%, or ≥40%, of the total thickness of the tile.

In one embodiment, the ratio of the thickness of the base layered section to the thickness of the décor layered section is ≥20, or ≥30, or ≥40. In one embodiment, the ratio of the thickness of the base layered section to the thickness of the décor layered section is ≤90, or ≤85, or ≤80. In one embodiment, the ratio of the thickness of the base layered section to the thickness of the décor layered section is from 20 to 80, or from 30 to 80, or from 40 to 80.

In one embodiment, the base layered section comprises ≥3 compositional layers, or ≥4 compositional layers.

In one embodiment, the base layered section comprises from 40 to 70 wt %, or from 50 to 70 wt %, or from 60 to 70 wt % of a filler, based on the weight of the base layered section.

In one embodiment, the base layered section comprises a compositional layer C1 that is formed from a composition C that comprises a filler (for example, $CaCO_3$). In a further embodiment, the base layered section comprises from 40 to 70 wt %, or from 50 to 70 wt %, or from 60 to 70 wt % of the filler, based on the weight of the base layered section.

In one embodiment, the base layered section comprises a compositional layer C2 that is formed from a composition C2 that comprises non-woven glass.

In one embodiment, the base layered section comprises a compositional layer C1 that is formed from a composition C1 that comprises a filler (for example, $CaCO_3$). In a further embodiment, the base layered section comprises a compositional layer C2 that is formed from a composition C2 that comprises non-woven glass. In a further embodiment, the base layered section comprises a compositional layer C3 formed from a composition C3 that comprises an olefin-based polymer and a filler (for example, $CaCO_3$). In a further embodiment, the thickness ratio of the compositional layers C1, C2 and C3 is 1.00 to 0.05 to 1.00. In a further embodiment, the base layered section comprises from 40 to 70 wt %, or from 50 to 70 wt %, or from 60 to 70 wt % of the filler, based on the weight of the base layered section.

Some Suitable Ethylene-based Polymers for the Layered Sections

Suitable ethylene-based polymers include ethylene-based interpolymers, such as ethylene/alpha-olefin interpolymers and copolymers. Suitable α-olefins include $C_3$-$C_{20}$ α-olefins, and preferably $C_3$-$C_{10}$ α-olefins, and more preferably $C_3$-$C_8$ α-olefins.

In one embodiment, the ethylene-based polymer is an ethylene/alpha-olefin copolymer. Suitable α-olefins include $C_3$-$C_{20}$ α-olefins, and preferably $C_3$-$C_{10}$ α-olefins.

In one embodiment, the ethylene-based polymer is an ethylene-based interpolymer. In one embodiment, the ethylene-based interpolymer comprises greater than, or equal to, 60 wt %, further greater than, or equal to, 70 wt %, further greater than, or equal to, 80 wt %, further greater than, or equal to, 85 wt %, polymerized ethylene, based on the weight of the interpolymer. In a further embodiment, the ethylene-based interpolymer is an ethylene-based copolymer. In one embodiment, the ethylene-based interpolymer is an ethylene/alpha-olefin interpolymer, and further an ethylene/alpha-olefin copolymer. Suitable α-olefins include, but are not limited to, $C_3$-$C_{20}$ α-olefins, and preferably $C_3$-$C_{10}$ α-olefins. More preferred α-olefins include propylene, 1-butene, 1-pentene, 1-hexene, 1-heptene and 1-octene, further include propylene, 1-butene, 1-hexene and 1-octene, and further 1-butene, 1-hexene and 1-octene.

In one embodiment, the ethylene-based polymer has a density ≥0.880 g/cc, or ≥0.890 g/cc, or ≥0.900 g/cc, or ≥0.910 g/cc (1 cc=1 $cm^3$). In one embodiment, the ethylene-based polymer has a density ≤0.950 g/cc, or ≤0.945 g/cc, or ≤0.940 g/cc, or ≤0.935 g/cc, or ≤0.930 g/cc, or ≤0.925 g/cc, or ≤, 0.920 g/cc. In one embodiment, the ethylene-based polymer is an ethylene/alpha-olefin interpolymer, and further an ethylene/alpha-olefin copolymer. Suitable α-olefins are described above.

In one embodiment, the ethylene-based polymer has a density from 0.880 g/cc to 0.950 g/cc, further from 0.890 g/cc to 0.940 g/cc, and further from 0.900 g/cc to 0.930 g/cc. In one embodiment, the ethylene-based polymer is an ethylene/alpha-olefin interpolymer, and further an ethylene/alpha-olefin copolymer. Suitable α-olefins are described above.

In one embodiment, the ethylene-based polymer has a density from 0.900 g/cc to 0.935 g/cc, further from 0.905 g/cc to 0.930 g/cc, and further from 0.910 g/cc to 0.925 g/cc. In one embodiment, the ethylene-based polymer is an ethylene/alpha-olefin interpolymer, and further an ethylene/alpha-olefin copolymer. Suitable α-olefins are described above.

In one embodiment, the ethylene-based polymer has a melt index ($I_2$, 2.16 kg, 190° C.) ≥0.25 dg/min, or ≥0.5 dg/min, or ≥0.6 dg/min, or ≥0.7 dg/min, or ≥0.8 dg/min, or ≥0.9 dg/min, or ≥1.0 dg/min, or ≥1.2 dg/min. In one embodiment, the ethylene-based polymer has a melt index (12, 2.16 kg, 190° C.) ≤100 dg/min, or ≤50 dg/min, or ≤20 dg/min, or ≤10 dg/min, or ≤5.0 dg/min. In one embodiment, the ethylene-based polymer is an ethylene/alpha-olefin interpolymer, and further an ethylene/alpha-olefin copolymer. Suitable α-olefins are described above.

The ethylene-based polymer may comprise a combination of two or more embodiments as described herein. The ethylene-based interpolymer may comprise a combination of two or more embodiments as described herein.

Suitable Propylene-based Polymers for Layered Sections

Suitable propylene-based polymers include propylene-based interpolymers, such as propylene/C4-C8 α-olefin interpolymers or copolymers, or a propylene/ethylene interpolymers or copolymers.

In one embodiment, the propylene-based polymer has a melt flow rate (MFR), at 230° C. and 2.16 kg load (ASTM D-1238), ≥0.5 dg/min, or ≥1.0 dg/min, or ≥2.0 dg/min. In one embodiment, the propylene-based polymer has a melt flow rate (MFR), at 230° C. and 2.16 kg load (ASTM D-1238), or ≤20 dg/min, or ≤15 dg/min, or ≤10 dg/min. In a further embodiment, the propylene-based polymer is a propylene-based interpolymer, such as a propylene/C4-C8 α-olefin interpolymer or copolymer, or a propylene/ethylene interpolymer or copolymer.

In one embodiment, the propylene-based polymer has a total percent crystallinity ≤60 wt %, or ≤50 wt %, or ≤40 wt %, as measured by DSC. In another embodiment, the propylene-based polymer has a total percent crystallinity from 20 to 60 wt %, or from 30 to 50 wt %, as measured by DSC. In a further embodiment, the propylene-based polymer is a propylene-based interpolymer, such as a propylene/C4-C8 α-olefin interpolymer or copolymer, or a propylene/ethylene interpolymer or copolymer.

In one embodiment, the propylene-based polymer has a density ≥0.860 g/cc, or ≥0.870 g/cc, or ≥0.875 g/cc. In one embodiment, the propylene-based polymer has a density ≤0.910 g/cc, or ≤0.905 g/cc, or ≤0.900 g/cc, or ≤0.895 g/cc, or ≤0.890 g/cc. In a further embodiment, the propylene-based polymer is a propylene-based interpolymer, such as a propylene/C4-C8 α-olefin interpolymer or copolymer, or a propylene/ethylene interpolymer or copolymer.

In one embodiment, the propylene-based polymer has a density from 0.860 g/cc to 0.910 g/cc, or from 0.870 g/cc to 0.890 g/cc, or from 0.880 g/cc to 0.890 g/cc. In a further embodiment, the propylene-based polymer is a propylene-based interpolymer, such as a propylene/C4-C8 α-olefin interpolymer or copolymer, or a propylene/ethylene interpolymer or copolymer.

In one embodiment, the propylene-based polymer has a melting temperature ($T_m$) from 100° C. to 140° C., or from 100° C. to 130° C., or from 100° C. to 120° C., as measured by DSC. In a further embodiment, the propylene-based polymer is a propylene-based interpolymer, such as a propylene/C4-C8 α-olefin interpolymer or copolymer, or a propylene/ethylene interpolymer or copolymer.

In one embodiment, the propylene-based interpolymer has a molecular weight distribution, $M_w/M_n$, from 2.0 to 5.0, or from 2.1 to 4.5, or from 2.2 to 4.0, or from 2.3 to 3.5, or from 2.4 to 3.0. In a further embodiment, the propylene-based polymer is a propylene-based interpolymer, such as a propylene/C4-C8 α-olefin interpolymer or copolymer, or a propylene/ethylene interpolymer or copolymer.

The propylene-based polymer may have a combination of two or more properties of the above embodiments. The propylene-based interpolymer may have a combination of two or more properties of the above embodiments. The propylene-based copolymer may have a combination of two or more properties of the above embodiments.

Compositions

A composition may comprise one or more additives. Additives include, but are not limited to, anti-oxidants, fire retardants, UV stabilizers, plasticizers, colorants, and fillers (e.g., inorganic fillers). A composition may also comprise two or more polymers. Suitable polymers include propylene-based polymers (both impact modifying polypropylene, isotactic polypropylene, atactic polypropylene, and random propylene/ethylene copolymers), polystyrene, impact modified polystyrene, ABS, styrene/butadiene block copolymers, and hydrogenated derivatives thereof (SBS and SEBS), and thermoplastic polyurethanes.

Lamination

The respective compositional layers of the wear layered section (compositional layer A), the décor layered section (compositional layers B1 and B2) and base layered section (compositional layer C), as demonstrated above, are heat laminated. The lamination can be carried out in one step where the respective compositional layers of the wear layered section (compositional layer A), the décor layered section (compositional layers B1 and B2) and base layered section (compositional layer C) are laminated at once. Alternatively, the respective compositional layers of the wear layered section, the décor layered section and the base layered section, as demonstrated above, are heat laminated in two steps. For example, the wear layered section (compositional layer A) and décor layered section (compositional layer B1) are laminated first, and then the décor layered section (compositional layer B2) is laminated with the base layered section (compositional layer C). Alternatively, the base layered section (C) and décor layered section (B2) are laminated first, and then the décor layered section (B1) is laminated with the wear layered section (A).

The lamination can be done using a compression molder, such as a Carver hydraulic press. The wear layered section, the décor layered section and base layered section are stacked together, according to FIG. 1, and are heat laminated. Alternatively, the lamination can be done using a laminator, such as Energy L 200 A Laminator, which is designed for the manual loading and unloading of the laminates.

Alternatively, the lamination can be conducted using a heated two-roll laminator, or a heated nip roll laminator. Similarly, the wear layered section (A side) and décor layered section (B1 side) are laminated first, and then the "wear layered section/décor layered section" bi-laminate is laminated with the base layered section (C side), using B2 side of the décor layered section. Alternatively, the base layered section (C side) and décor layered section (B2 side) are laminated first, and then the "base layered section/décor layered section" bi-laminate is laminated with the wear layered section (A side), using the B1 side of the décor layered section. As the moving web enters the nip section, it is laminated. The nip roll temperature can be set from 70° C. to 140° C. The temperature at the interface is measured by placing a thermal couple at the interface. The temperature at the interface can also be measured by using a noncontact infrared thermometer. Alternatively, the surfaces of the components to be heat laminated can be heated by an IR heater, or other radiant heater, to desired temperatures, such as from 70° C. to 140° C. Nip pressures can be controlled manually or pneumatically with air cylinders. Typical pressure ranges from 10 to 100 psi. Most of the heat is removed from the laminate by the chrome-plated chill rolls.

The final laminate, including wear layered section, décor layered section and base layered section, ranges from 1.0 to 7.5 mm in thickness, more preferably 2.0 to 5.0 mm in thickness.

Commercial Scale Production of Tiles

FIGS. 14 and 15 are schematics of exemplary commercial processes that may be used to make the tiles. FIG. 14 shows a method of manufacture which involves successive laminations of the aforementioned base layered section, décor layered section and wear layered section (all in roll stock form), followed by the optional addition of top coat, which is often used in conventional tile structures. FIG. 14 shows a base layered section ("base layer") and a décor layered section ("décor layer") being unwound from unwind stands and fed into a nip roll assembly, where the two layers are thermally laminated together. Such unwind stands are common in the film and sheet industries and typically have tensioning control systems. Both layered sections are fed to the nip, which imparts pressure, as described earlier in this filing. The sealing surface is pre-heated with banks of infra-red (or other radiant) heaters. The DAYTON 3E134 Commercial Infrared Heater, NG, 90, 000 would be an example of such a heater. For immediate after heaters, there are temperature sensing devices that control those heaters, based on the desired thermal lamination temperatures. An example of these devices are FLUKE ENDURANCE HIGH TEMPERATURE INFRARED PYROMETERS, which are often custom designed for such production lines, based on the space available and the accuracy required. Driven rollers are used to pull the layered section through the process and also maintain pressure where needed for lamination. After the base layered section and the décor layered section have been thermally laminated together, the laminated structure is joined to the wear layered section in a similar driven nip setup. Both the wear layered section and "base/décor" laminate are pre-heated with the same infra-red setup as used prior to the first lamination step. These successive laminations serve to combine all three layered sections together into an olefin-based resilient tile.

Optionally, the three-layer structure can be top coated. Urethane acrylates are often added to provide initial product aesthetics and to provide an entire layer of protection beyond the wear layered section. These top coats often contain hardeners such as aluminum oxide to even greater protection. They are often UV cured. An example of such a top coat is Akzo Nobel's 977-113 PHOTOGLAZE® UV COATING. Additional primer and corona treating stations are included in FIG. 14, since, in some cases, these may be required to get the top coat to adhere to the composite structure. That structure is either wound up with a large winder, or simply cut to size on table cutters positioned on the end of the line, and then packaged for sale. The details of the tensioned unwind stands, driven nip rolls are often part of commercial turnkey packages for entire lines, like those shown in FIGS. 14 and 15, and are offered by such equipment suppliers as Ulbrecht (Germany) or Rodolpho Cammerio (Italy). Thus, improved floor tiles are produced that eliminate, or significantly reduce, emissions during their manufacture, end-use, or combustion. In addition, the décor film of the tile is easily bonded to the wear layer and to the base layer without deteriorating the tile structure. These tile that can be readily recycled or reprocessed.

Definitions

Unless stated to the contrary, all test methods are current as of the filing date of this disclosure.

The term "tile," as used herein, refers to a structure that comprises a wear layered section, a décor layered section and a base layered section. Preferably, the tile has a total thickness $\geq 1.5$ mm, further $\geq 1.8$ mm, further $\geq 2.0$ mm, further $\geq 2.2$ mm, further $\geq 2.5$ mm, further $\geq 2.8$ mm, further $\geq 3.0$ mm.

The term "wear layered section," as used herein, refers to the section of the tiled structure that is in contact (surface-to-surface contact) with the uppermost compositional layer of the décor layered section. The wear layered section is used to protect the décor layered section. A top coat (for example, a polyurethane film) may be applied to the exposed surface of the wear layered section.

The term "décor layered section," as used herein, refers to the portion of the tiled structure that is located between the wear layered section and the base layered section. The décor layered section typically comprises an inked pattern.

The term "base layered section," as used herein, refers to section of the tile that is in contact (surface-to-surface contact) with the lowermost compositional layer of the décor layered section.

The term "compositional layer," as used herein, refers to one film layer formed from a composition. A film layer may include two or more adjacent (surface-to-surface) sub-layers (for example, two or more adjacent extruded sub-layers, or two or more adjacent cast sub-layers, or two or more adjacent blown sub-layers), and where each layer is formed from the same composition. For example, a "seven extruders" system can be used to form five compositional layers, such as an A/BB/C/DD/E structure, or three compositional layers, such as an AA/BBB/CC structure.

The terms "heat laminating," "heat lamination," or similar terms, as used herein, refer to the process of adhering two surfaces by the application of heat and pressure.

The term "oriented polymer," as used herein, refers to the stretching of a polymer in the machine direction and/or cross direction, each direction relative to extrusion of the polymer.

The term "oriented film," as used herein, refers to the stretching of a film in the machine direction and/or cross direction, each direction relative to extrusion of the film.

The term "tie layer," as used herein, refers to a compositional layer formed from a composition comprising a functionalized polymer (for example, a maleic anhydride grafted olefin-based polymer, an ethylene/vinyl acetate copolymer, an ethylene/methylacrylate copolymer, or an ethylene/ethyl acrylate copolymer). A functionalized polymer comprises at least one type of heteroatom (for example, oxygen).

The phrase "continuous production of the tile," as used herein, refers to the manufacture of the tile, in which the layered sections are continually fed into one or more lamination units, and the resulting tile is continually removed from the lamination unit(s). The resulting tile may be wound around a spool, or may be cut into slabs of tile and stacked.

The phrase "batch production of the tile," as used herein, refers to the manufacture of the tile, in which the layered sections are first stacked to form a pre-tile, and the pre-tile is heat laminated (batch laminated) to form the tile.

For a batch process, the interfacial temperature refers to the steady state temperature in between the two compositional layers, during the compression stage of the lamination process.

For a continuous process, the temperature at the surface of the compositional layer is measured just prior to (typically within one foot, and steady state temp.) the first compression step of the lamination process.

Reverse printing is the process of printing on the back side of a clear substrate, sometimes referred to as subsurface printing, with a reverse image. This is useful as the print is protected from damage caused by environmental factors (such as humidity and exposure to light) and abrasion.

The term "composition," as used herein, includes a material or mixture of materials which comprise the composition, as well as reaction products and decomposition products formed from the materials of the composition. Typically, any reaction products and/or decomposition products are present in trace amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "olefin-based polymer," as used herein, refers to a polymer that comprises, in polymerized form, a majority amount of an olefin monomer, for example, ethylene or propylene, based on the weight of the polymer, and optionally may comprise one or more comonomers.

The term "propylene-based polymer," as used herein, refers to a polymer that comprises, in polymerized form, a majority amount of propylene monomer based on the weight of the polymer and, optionally may comprise one or more comonomers.

The term, "propylene-based interpolymer," as used herein, refers to an interpolymer that comprises, in polymerized form, a majority amount of propylene monomer (based on the weight of the interpolymer), and at least one comonomer.

The term, "propylene-based copolymer," as used herein, refers to a copolymer that comprises, in polymerized form, a majority amount of propylene monomer (based on the weight of the copolymer), and a comonomer, as the only two monomer types.

The term, "propylene/α-olefin interpolymer," as used herein, refers to an interpolymer that comprises, in polymerized form, a majority amount of propylene monomer (based on the weight of the interpolymer), and at least one α-olefin. The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene interpolymer," as used herein, refers to an interpolymer that comprises, in polymerized form, a majority amount of propylene monomer (based on the weight of the interpolymer), and ethylene.

The term, "propylene/ethylene copolymer," as used herein, refers to a copolymer that comprises, in polymerized form, a majority amount of propylene monomer (based on the weight of the copolymer), and ethylene, as the only two monomer types.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene-based interpolymer," as used herein, refers to an interpolymer that comprises, in polymerized form, a majority amount of ethylene monomer (based on the weight of the interpolymer), and at least one comonomer.

The term, "ethylene-based copolymer," as used herein, refers to a copolymer that comprises, in polymerized form, a majority amount of ethylene monomer (based on the weight of the copolymer), and a comonomer, as the only two monomer types.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density

Density was measured in accordance with ASTM D-792.

Melt Index (h) and Melt Flow rate (MFR) Melt index (2.16 kg, 190° C.) for an ethylene-based polymer was measured in accordance with ASTM D-1238.

MFR (2.16 kg, 230° C.) for a propylene-based polymer was measured in accordance with ASTM D-1238.

Differential Scanning Calorimetry (DSC) (Component A and Component B)

Differential Scanning Calorimetry (DSC) is used to measure melting and crystallization behavior of polymers (e.g., ethylene-based (PE) polymers, and propylene-based (PP) polymers). The sample is first melt pressed (25000 lbs for about 10 sec) into a thin film, at about 175° C., and then cooled to room temperature. About 5 mg to 8 mg of polymer film sample is cut with a die punch and is weighed and placed into a DSC pan. The lid is crimped on the pan to ensure a closed atmosphere. The sample pan is placed into a calibrated DSC cell purged with nitrogen gas, and then heated at a rate of approximately 10° C./min, to a temperature of 180° C. for PE (230° C. for PP). The sample is kept at this temperature for three minutes. Then the sample is cooled at a rate of 10° C./min to −40° C., to record the crystallization trace, and kept isothermally at that temperature for three minutes. The sample is next reheated at a rate of 10° C./min, until complete melting. Unless otherwise stated, peak melting point (Tm) is determined from the second heating curve, and corresponds to the temperature of the highest peak (intensity) in the endotherm. The crystallization temperature (Tc) is determined from the cooling curve (peak Tc). The Tg is measured from the second heating curve, and determined at the midpoint of the inflection transition.

Interfacial Adhesion Strength

The interfacial adhesion strength is measured by a peel strength test according to ASTM F88/8F88-09, for 180° peel, at 23° C., on an INSTRON tester (model 5500R) at 50 mm gap, at a rate of 25 mm/min. Average peel force at plateau of five specimen is reported.

Experimental Materials

TABLE 1

| Materials | Melting temperature (° C.) |
|---|---|
| RCPP1, Propylene/ethylene random copolymer, 10.0 MFR, density 0.897 g/cm$^3$ | 132 |
| PRO-FAX RP323M, 8.0 MFR, density 0.900 g/cm$^3$, LyondellBasell Industries | 143 |
| hPP D115A, 11 MFR, density 0.900 g/cm$^3$, Braskem | 165 |
| ADSYL 5C30F, 5.5 MFR, density 0.900 g/cm$^3$, LyondellBasell Industries | 132 |
| ADSYL 6C30F, 5.5 MFR, density 0.900 g/cm$^3$, LyondellBasell Industries | 126 |
| VERSIFY 3000, 8.0 MFR, 0.891 g/cm$^3$, Dow Chemical | 103 |
| VERSIFY 3200, 8.0 MFR, 0.876 g/cm$^3$, Dow Chemical | 83 |
| VERSIFY 2200, 2.0 MFR, 0.876 g/cm$^3$, Dow Chemical | 82 |
| VERSIFY 4200, 25 MFR, 0.876 g/cm$^3$, Dow Chemical | 84 |
| AFFINITY PL1280G, 6.0 MI, 0.900 g/cm$^3$, Dow Chemical | 96 |
| ENGAGE 8402, 30 MI, 0.902 g/cm$^3$, Dow Chemical | 96 |
| DMDC 1210, 10 MI, 0.952 g/cm$^3$, Dow Chemical | 130 |
| AMPLIFY GR204 functional polymer, Dow Chemical | 127 |

Wear Layered Section (Mono Compositional Layer of Multi Compositional Layers)
Polymerization of RCPP1

A continuous solution polymerization was carried out in a controlled well-mixed reactor. Purified mixed alkanes solvent (ISOPAR E available from Exxon Mobil, Inc.), ethylene, propylene, and hydrogen (where used) were combined and fed to a 52 gallon reactor. The feeds to the reactor were measured by mass-flow controllers. The temperature of the feed stream was controlled by use of a cooled heat exchanger before entering the reactor. The catalyst component solutions were metered using pumps and mass flow meters. The reactor was run liquid-full at approximately 550 psig pressure. Upon exiting the reactor, water and additive were injected into the polymer solution to terminate remaining polymerization reactions. The solvent and unreacted monomers were removed during a two stage devolatization process of the post reactor, polymer solution process. The polymer melt was pumped to a die for underwater pelletization. Further details are described in Tables 2 and 3a below.

TABLE 2

| Polymerization Conditions for RCPP1 | | | | | | | |
|---|---|---|---|---|---|---|---|
| | C3 Propylene lb/hr | C2 Ethylene lb/hr | Mixed Alkanes Solvent lb/hr | H2 sccm[1] | Temp. ° C. | Cat.[2] Conc. ppm | Cat. Flow lb/hr |
| RCPP1 | 360 | 5.4 | 885 | 800 | 125 | 40 | 0.69 |

TABLE 3a

| Polymerization Conditions for RCPP1 | | | | | | | |
|---|---|---|---|---|---|---|---|
| | Cocat-1[5] Conc, ppm | Cocat 1 Flow lb/hr | Cocat 2[6] Conc. ppm | Cocat 2 Flow lb/hr | Polym. Rate[7] lb/hr | Conv[3] wt % | Polymer wt % | Eff.[4] |
| RCPP1 | 400 | 0.60 | 400 | 0.32 | 240 | 66.6 | 19.2 | 8.7 |

Footnotes for Table 1 and Table 2:

[1] Standard cm3/min.

[2] Catalyst:[[2',2'''-[1,2-cyclohexanediylbis(methyleneoxy-κO)]bis[3-(9H-carbazol-9-yl)-5-methyl[1,1-biphenyl]-2-olato-κO]](2-)]hafnium dimethyl.

[3] Weight percent propylene conversion in reactor.

[4] Efficiency, 1,000,000 lb polymer/lb Hf.

[5] Cocatalyst-1 (Cocat 1): bis-hydrogenated tallow alkyl methylammonium tetrakis-pentafluorophenyl borate (from Boulder Scientific).

[6] Cocatalyst-2 (Cocat 2): modified methaluminoxane (MMAO-3A, from Akzo-Nobel).

[7] Polymerization Rate.

In this invention, the wear layered sections are fabricated via a co-extrusion, cast film process using a Dr. Collin co-extrusion cast film line (Margot Machinery, Inc.), equipped with three single screw extruders. The total thickness of each wear layered section is approximately 20 mils. The process conditions are reported in Table 3b, based on the formulation components reported in Table 4. For Ex. W2, the 1 wt % silica is added to RCPPI using 5% of a masterbatch (20% Aerosil 9200 (available from Evonik) in VERSIFY™ 3000 MB).

TABLE 3b

Process condition for wear layered section

| | |
|---|---|
| Die Total Gap, mils | 40 |
| Air Gap, in | 1 |
| Film Width, in | 8 |
| Film Thickness, mils | 20 |
| Total Throughput, kg/h | 6.5 |

| | Extruder 1 | Extruder 2/Extruder 3 |
|---|---|---|
| Type of Layer | Sealant layer | Substrate |
| Melt Temperature at thermocouple at die, °C. | 200-210 | 234-236 |

TABLE 4

Compositional Layers for Wear Layered Section

| Ex. | Extruder 1 | Extruder 2/3 | Final Film structure | Final Film thickness (mil) |
|---|---|---|---|---|
| W1 | RCPP1 | RCPP1 | monolayer film | 20 |
| W2 | RCPP1 + 1 wt % Silica | RCPP1 + 1 wt % Silica | monolayer film | 20 |
| W3 | hPP D115A | hPP D115A | monolayer film | 20 |
| W4 | VERSIFY 3200 | RCPP1 | sealant/substrate (10/90) film | 20 |
| W5 | VERSIFY 3000 | RCPP1 | sealant/substrate (10/90) film | 20 |
| W6 | Pro-fax RP323M | Pro-fax RP323M | monolayer film | 20 |

Décor Layered Section

Décor Layered Section Fabricated Using Coextrusion Process

In this example, décor layers each having a thickness of approximately 4 mil (101.6 μm) are fabricated via a co-extrusion, cast film process on a Dr. Collin co-extrusion cast film line (Margot Machinery, Inc.), equipped with three single screw extruders. Process conditions are in Table 5 (based on the formulation components reported in Table 6).

TABLE 5

Process condition for Décor Layered Section

| | |
|---|---|
| Die Total Gap, mils | 35 |
| Film Width, in | 8 |
| Film Thickness, mils | 4 |
| Total Throughput, Kg/h | 6 |

| | Extruder 1 | Extruder 2 | Extruder 3 |
|---|---|---|---|
| % Thickness, Target | 20% | 60% | 20% |
| Melt Temperature at thermocouple at die, °C. | 200-210 | 230-240 | 220-230 |

TABLE 6

Compositional Layers for Décor Layered Section

| Example | Layer 1 L1 (B1) | Layer 2 L2 | Layer 3 L3 (B2) | Film thickness (mil) |
|---|---|---|---|---|
| D1 | VERSIFY 3200* | hPP D115A | AFFINITY 1280G** | 4 |
| D2 | VERSIFY 3200* | VERSIFY 3200 | AFFINITY 1280G** | 4 |
| D3 | VERSIFY 3200* | hPP 115A | VERSIFY 3200* | 4 |
| D4 | ADSYL 5C30F | hPP 115A | AFFINITY 1280G** | 4 |
| D5 | ADSYL 6C30F | hPP 115A | AFFINITY 1280G** | 4 |

*2% MB 102777 antiblock (available from Ampacet Corporation) is added
**2% MB 10063 antiblock (available from Ampacet Corporation) is added Décor Layered Section Fabricated Using BOPP and Adhesive Lamination A polyolefin film (PO1) has been fabricated for the adhesive lamination. The PO1 film with a thickness of approximately 2 mil (50.8 µm) is fabricated via a co-extrusion, cast film process, on a Dr. Collin co-extrusion cast film line (Margot Machinery, Inc.), equipped with three single screw extruders. Process conditions are in Table 7 (based on the formulation components reported in Table 8). The substrate layer (HDPE DMDC 1210 based) and sealant layer (AFFINITY PL1280G) has the ratio of 80/20. Prior to the film fabrication, HDPE DMDC 1210 and CaCO3 (Atomite Grade, available from Imerys) blend (80/20, wt/wt) is compounded using a ZSK-26 eleven barrel extruder equipped with water bath and strand cutter system.

BOPP film CHS45T at the thickness of 45 um (BOPP1) is available from Inteplast (Livingston, N.J.). A wood grain pattern has been digitally printed on the treated side of BOPP film internally using acrylate based ink. Then the printed BOPP film is laminated to PO1 with solvent based ADCOTE HP adhesive (Adcote 577/L87-124, Dow Chemical). The adhesive lamination is between the ink side of the reverse printed BOPP film and the HDPE side of the PO1 film. This décor layered section is coded as D6. The final film thickness is about 4 mil. The sealant layer in BOPP film CHS45T is defined as B1 and the AFFINITY 1280G layer in PO1 film is defined as B2.

TABLE 7

Process condition for Polyolefin film for Décor Layered Section

| | |
|---|---|
| Die Total Gap, mils | 25 |
| Film Width, in | 8.5 |
| Film Thickness, mils | 2 |
| Total Throughput, Kg/h | 6 |

| | Extruder 1/Extruder 2 | Extruder 3 |
|---|---|---|
| % Thickness, Target | 80% | 20% |
| Melt Temperature at thermocouple at die, ° C. | 210-230 | 210-230 |

TABLE 8

Polyolefin film (PO1) structure for Décor Layered Section

| Example | Layer 1 L1 | Layer 2 L2 | Layer 3 L3 (B2) | Film thickness (mil) |
|---|---|---|---|---|
| PO1 | HDPE DMDC 1210/ CaCO3 80/20 | HDPE DMDC 1210/ CaCO3 80/20 | AFFINITY 1280G | 2 |

Base Layered Section

The base layered section (BASE 1) is composed of filled ethylene-based polymer (filled POE). The filled POE is compounded using a Wener-Pfleiderer ZSK-26 eleven barrel twin screw extruder. The total throughput is 30 lb/hr. The screw RPM is 400 and the extruder melt temperature ranges from 186-190° C. BASE 1 is a mono-layer cast sheet having a thickness of approximately 40 mils that is prepared via a co-extrusion cast film process, using a Dr. Collin co-extrusion cast film line (Margot Machinery, Inc.), equipped with three single screw extruders. The extruder conditions are reported in Table 9 (based on the formulation components reported in Table 10). In order to get to the desired 80 mils, two or more thinner layers of this material will have to be laminated together.

TABLE 9

Extruder Conditions

| | |
|---|---|
| Die Total Gap, mils | 45 |
| Air Gap, in | 1 |
| Film Width, in | 8-10 |
| Film Thickness, mils | 40 |
| Total Throughput, kg/h | 16-19 |

| | Extruder 1/Extruder 2/Extruder 3 | | |
|---|---|---|---|
| Material | Filled POE | | |
| Melt Temperature at thermocouple at die, ° C. | 225-230 | 225-230 | 225-230 |

TABLE 10

Formulation for BASE 1

| | |
|---|---|
| 60 wt % | Boral Celceram PV-20A coal fly ash |
| 26 wt % | ENGAGE 8402 (0.902 g/cc, 30 MI) polyolefin elastomer |
| 10 wt % | Eastman EASTOTAC H-115R Hydrocarbon Tackifier |
| 4 wt % | AMPLIFY GR204 functional polymer |

BASE 2 is identical to BASE 1 described above, except that VERSIFY 4200 propylene-ethylene copolymer is used in place of the ENGAGE 8402 polyolefin elastomer. BASE 3 is identical to BASE 1 described above, except that RCPP1 is used in place of ENGAGE 8402 polyolefin elastomer.

BASE 4 is a two-layer cast sheet, having a thickness of approximately 40 mils. The substrate layer is the same as BASE 3 described above, using Extruder 2 and Extruder 3, with a sealant layer composed of VERSIFY 2200, using Extruder 1. The thickness ratio between the substrate layer and the sealant layer is 90/10.

Additional layers of the base layered section would allow for the incorporation of recycle. This recycle could include edge trim from the manufacture of the product, re-extrudate of the entire recycled tiles, and incorporation of recycled plastics or other materials such as recycled glass, organic fillers, etc. These are blended with the base formulation at various levels into an additional layer(s) depending on the recycle quality.

Heat Lamination

Two Step Lamination

The respective compositional layers of the wear layered section, the décor layered section and the base layered section, as demonstrated above, are heat laminated in two steps. For example, the wear layered section (compositional layer A) and décor layered section (compositional layer B1) are laminated first, and then the décor layered section (compositional layer B2) is laminated with the base layered section (compositional layer C). Alternatively, the base layered section (compositional layer C) and décor layered section (compositional layer B2) are laminated first, and then the décor layered section (compositional layer B1) is laminated with the wear layered section (compositional layer A). Typical equipment is a compression molder, such as a Carver hydraulic press. The selected layers are stacked together and die cut into "5 inch×5 inch," or other sized squares. The die cut stack is laminated in the molder from 80° C. to 150° C. (set temperature or plate temperature), for 20 to 30 seconds, at 1000 to 5000 lb force.

The temperature at the interfaces, T1 or T2, is measured by placing a thermal couple (such as Omega 88309K thin leaf thermocouple, 0.05 mm thickness conductors) at each interface (compositional layers A and B1, and/or compositional layers B2 and C). The thermocouple is connected to a data logger such as Omega OM-DAQPRO-5300 to record the temperature profile during the process. The temperature ramp up and final equilibrium can be captured in the data. The interval between data point is one second. Typically, the interfacial temperature is about 10° C. lower than the plate temperature due to short heating duration. FIG. 16 demonstrates the T1 profile at different plate temperatures when wear layered section is laminated with décor layered section. FIG. 17 demonstrates the T2 profile at different plate temperatures when base layered section is laminated with decor layered section. FIG. 18 demonstrates the T1 profile during a tile lamination (including wear layered section, décor layered section and base layered section) at different plate temperatures. During the lamination of the whole tile, T2 is virtually the same as T1 as the décor layered section is typically a thin film.

Interfacial adhesion strength at different plate temperatures is shown in Table 11. Lower temperature results in low adhesion strength. When the tensile force is less than 5 lbf, the failure mode is typically delamination. Between 5 and 10 lbf/in, the failure mode is a mixture of delamination and yield of the décor film. Generally a greater than 10 lbf/in adhesion force is required for this application. Inventive examples are those having an adhesion value >10 lbf/in at the interface temperature ≤140° C. This requires careful selection of sealant materials at both interfaces, including compatibility and the melting attributes of the materials at the interface.

In one example (Inventive Tile 1), W2, D1, and two stacks of BASE1 are laminated together. The structure of Inventive Tile 1 is shown in FIG. 19. The plate temperatures are 150° C. and 100° C. for top plate and bottom plate, respectively. The compression force is 1500 lbf and lamination duration is 20 seconds. The thickness of each layer is measured before the lamination. The theoretical thickness is calculated by adding them up. The final laminated tile thickness was measured after the tile has returned to ambient temperature and compared to the theoretical thickness. Table 12 shows the comparison of thickness. The final product has same thickness as the sum of all layers. In this example, the Décor layered section is not printed.

TABLE 12

Thickness of the final tile W2//D1//BASE1//BASE1

| Section | Average Thickness (mil) | standard deviation |
| --- | --- | --- |
| Wear layered section (W2) | 22.1 | 0.47 |
| Decor layered section (D1) | 4.7 | 0.13 |
| Base layered section (BASE1) | 44.4 | 0.73 |
| Calculated thickness (W2, D1 and 2 of BASE1) | 115.6 | 2.06 |
| Measured tile thickness | 116.6 | 0.92 |

TABLE 11

Interfacial adhesion strength for A/B1 and B2/C at different plate temperature

| | | | Interfacial adhesion strength (lbf/in) | | | | |
| --- | --- | --- | --- | --- | --- | --- | --- |
| | Plate Temperature | | 80° C. | 90° C. | 110° C. | 130° C. | 150° C. |
| Interface Example | T @ interface (T1 or T2) | | 68-72 | 78-81 | 96-100 | 114-118 | 130-135 |
| Inventive Ex 1 | | D3 BASE1 | 2 | 6 | 10 | 14 | 14 |
| Comparative Ex A | | D2 BASE2 | 0 | 0 | 7 | 5 | 5 |
| Inventive Ex 2 | | D3 BASE2 | 0 | 10 | 12 | 14 | 14 |
| Inventive Ex 3 | | D3 BASE4 | 0 | 10 | 11 | 10 | 11 |
| Comparative Ex B | | D5 BASE4 | 2 | 6 | 4 | 3 | 3 |
| Inventive Ex 4 | W1 | D1 | 0 | 4 | 8 | 12 | 15 |
| Inventive Ex 5 | W1 | D4 | 0 | 0 | 1 | 10 | 11 |
| Inventive Ex 6 | W1 | D5 | 0 | 0 | 1 | 11 | 11 |
| Inventive Ex 7 | W2 | D1 | 0 | 6 | 10 | 15 | 14 |
| Inventive Ex 8 | W2 | D4 | 0 | 0 | 0 | 13 | 12 |
| Inventive Ex 9 | W2 | D5 | 0 | 0 | 0 | 11 | 11 |
| Comparative Ex C | W3 | D1 | 0 | 0 | 6 | 9 | 10 |
| Comparative Ex D | W3 | D4 | 0 | 0 | 0 | 2 | 10 |
| Inventive Ex 10 | W3 | D5 | 0 | 0 | 0 | 2 | 11 |
| Inventive Ex 11 | W4 | D1 | 0 | 8 | 12 | 12 | 16 |
| Inventive Ex 12 | W4 | D4 | 0 | 0 | 9 | 16 | 18 |
| Inventive Ex 13 | W4 | D5 | 0 | 2 | 10 | 15 | 15 |
| Inventive Ex 14 | W5 | D1 | 0 | 0 | 10 | 12 | 14 |
| Inventive Ex 15 | W5 | D4 | 0 | 0 | 0 | 4 | 14 |
| Inventive Ex 16 | W5 | D5 | 0 | 0 | 1 | 10 | 12 |
| Inventive Ex 17 | W6 | D1 | 0 | 4 | 8 | 11 | 14 |
| Inventive Ex 18 | W6 | D4 | 0 | 0 | 0 | 3 | 14 |
| Comparative Ex E | W6 | D5 | 0 | 0 | 0 | 4 | 10 |

One Step Lamination

The final tile structure can be achieved by single-step heat lamination. In this case, the respective compositional layers of the wear layered section, the décor layered section and base layered section, as demonstrated above, are stacked together according to FIGS. 10 to 13, and heat laminated in one step. The lamination condition is similar to two-step lamination where the plate temperature is 100° C. to 150° C., lamination duration is within 20 to 30 seconds, and the compression force is 1000 to 5000 lbf.

In another example (Inventive Tile 2), W2, the printed and laminated BOPP décor layered section (BOPP film CHS45T, reverse printed, adhesive laminated with PO1 film), and two stacks of BASE1 are laminated together. The structure of Inventive Tile 2 is shown in FIG. 20. The plate temperatures are 150° C. and 100° C. for top and bottom plate respectively. The compression force is 1100 lbf and lamination duration is 30 seconds. The final laminated tile shows clearly the wood grain pattern that has been printed on BOPP film.

What is claimed is:

1. A method to produce a tile comprising at least the following layered sections:
   a wear layered section, a décor layered section and a base layered section; and
   wherein the wear layered section comprises the following:
   A) a compositional layer A formed from a composition A comprising at least one olefin-based polymer;
   wherein the décor layered section comprises the following:
   B1) a compositional layer B1 formed from a composition B1 comprising a propylene-based polymer;
   B2) a compositional layer B2 formed from a composition B2 comprising an olefin-based polymer;
   wherein the base layered section comprises the following:
   C) a compositional layer C formed from a composition C comprising an olefin-based polymer;
   wherein the method comprises the following step(s):
   i) heat laminating compositional layer A to compositional layer B1, at a temperature T1≤140° C.; and
      wherein, for a continuous production of the tile, T1 is the temperature at the surface of the compositional layer with the highest, or equivalent, surface temperature; and for a batch production of the tile, T1 is the interfacial temperature between the two compositional layers;
   ii) heat laminating compositional layer B2 to compositional layer C, at a temperature T2≤140° C.; and
      wherein, for a continuous production of the tile, T2 is the temperature at the surface of the compositional layer with the highest, or equivalent, surface temperature; and for a batch production of the tile, T2 is the interfacial temperature between the two compositional layers.

2. The method of claim 1, wherein the olefin-base polymer in composition B2, has a Tm less than 120° C.

3. The method of claim 1, wherein the propylene-based polymer in composition B1, is a propylene-based interpolymer.

4. The method of claim 1, wherein composition B1 comprises ≥90 wt % of the propylene-based polymer, based on the weight of composition B1.

5. The method of claim 1, wherein the olefin-based polymer in composition A, is a propylene-based polymer.

6. The method of claim 1, wherein composition A comprises ≥90 wt % of the olefin-based polymer, based on the weight of composition A.

7. The method of claim 1, wherein the tile comprises ≤1 wt % of a polyurethane, based on the weight of the tile.

8. The method of claim 1, wherein the tile comprises ≤5 wt % of a carboxylic acid grafted and/or anhydride grafted polymer, based on the weight of the tile.

9. The method of claim 1, wherein the tile comprises ≤10 wt % of a tackifier, based on the weight of the tile.

10. The method of claim 1, wherein the tile comprises ≤1 wt % of an ethylene vinyl acetate copolymer, based on the weight of the tile.

11. The method of claim 1, wherein the tile has a total thickness ≥2 mm.

12. The method of claim 1, wherein the method does not comprise a vacuum forming process.

13. The method of claim 1, the method is a continuous production of the tile.

* * * * *